(12) United States Patent
Willey

(10) Patent No.: US 7,966,949 B2
(45) Date of Patent: Jun. 28, 2011

(54) DEVICE FOR SUPPORTING AN ITEM(S) WHILE IN TRANSIT WITHIN A VEHICLE HAVING PASSENGER SEATING AND WHEN CARRIED FROM LOCATION TO LOCATION

(76) Inventor: Kevin E. Willey, Fort Collins, CO (US)

( * ) Notice: Subject to any disclaimer, the term of this patent is extended or adjusted under 35 U.S.C. 154(b) by 368 days.

(21) Appl. No.: 11/998,050

(22) Filed: Nov. 27, 2007

(65) Prior Publication Data
US 2008/0134945 A1 Jun. 12, 2008

Related U.S. Application Data

(60) Provisional application No. 60/861,403, filed on Nov. 27, 2006.

(51) Int. Cl.
*A47B 23/00* (2006.01)
(52) U.S. Cl. ............... 108/44; 108/25; 224/275
(58) Field of Classification Search .......... 108/44, 108/45, 54.1, 55.1, 55.3, 1, 10, 91, 92; 297/188.01, 297/188.08, 188.2; 224/275
See application file for complete search history.

(56) References Cited

U.S. PATENT DOCUMENTS

| | | | | |
|---|---|---|---|---|
| 2,621,807 A * | 12/1952 | Rendich | ............ | 248/220.31 |
| 2,640,595 A * | 6/1953 | Byford | ............ | 108/44 |
| 2,704,114 A * | 3/1955 | Williams | ............ | 297/188.16 |
| 3,026,159 A * | 3/1962 | Miller et al. | ............ | 108/1 |
| 3,433,184 A * | 3/1969 | Addy | ............ | 108/901 |
| 3,922,973 A * | 12/1975 | Sturgeon | ............ | 108/26 |
| 4,300,709 A * | 11/1981 | Page, Jr. | ............ | 224/275 |
| 4,524,701 A * | 6/1985 | Chappell | ............ | 108/44 |
| 4,843,975 A * | 7/1989 | Welsch et al. | ............ | 108/24 |
| 4,989,846 A * | 2/1991 | Quinn | ............ | 269/54.5 |
| 5,026,033 A * | 6/1991 | Roxy | ............ | 269/309 |
| 5,282,598 A * | 2/1994 | Greene | ............ | 224/275 |
| 5,720,458 A * | 2/1998 | Carpenter | ............ | 224/275 |
| 6,065,656 A * | 5/2000 | Elshof | ............ | 224/275 |

* cited by examiner

*Primary Examiner* — José V Chen
(74) *Attorney, Agent, or Firm* — Macheledt Bales LLP

(57) ABSTRACT

An assembly for supporting at least one item while in transit within a vehicle having cushioned passenger seating. The assembly used during transit within a vehicle, has: a platform (for supporting the item) that has an aperture for receiving at least one primary support-post therethrough, and a plurality of recesses; an anchor for releasably securing the assembly between cushion structures within the vehicle is used (e.g., such that it can be wedged into the spacing between back support cushion and seat cushion). The anchor comprises a base member having a free end and a bulbous end, between which a pedestal extends having a recessed shape, such as a cup, for receiving a lower end of the primary support-post. The bulbous end can be fabricated integral with the base member, or made of one or more hinged-sections interconnected with the base member. At least a portion of the outer surface of the primary support-post is preferably threaded, around which a mating internally-threaded leveling ring can twist. Also, an assembly for supporting at least one item while in transit from location to location, wherein the anchor and primary support-post and leveling ring are not operationally assembled.

17 Claims, 19 Drawing Sheets

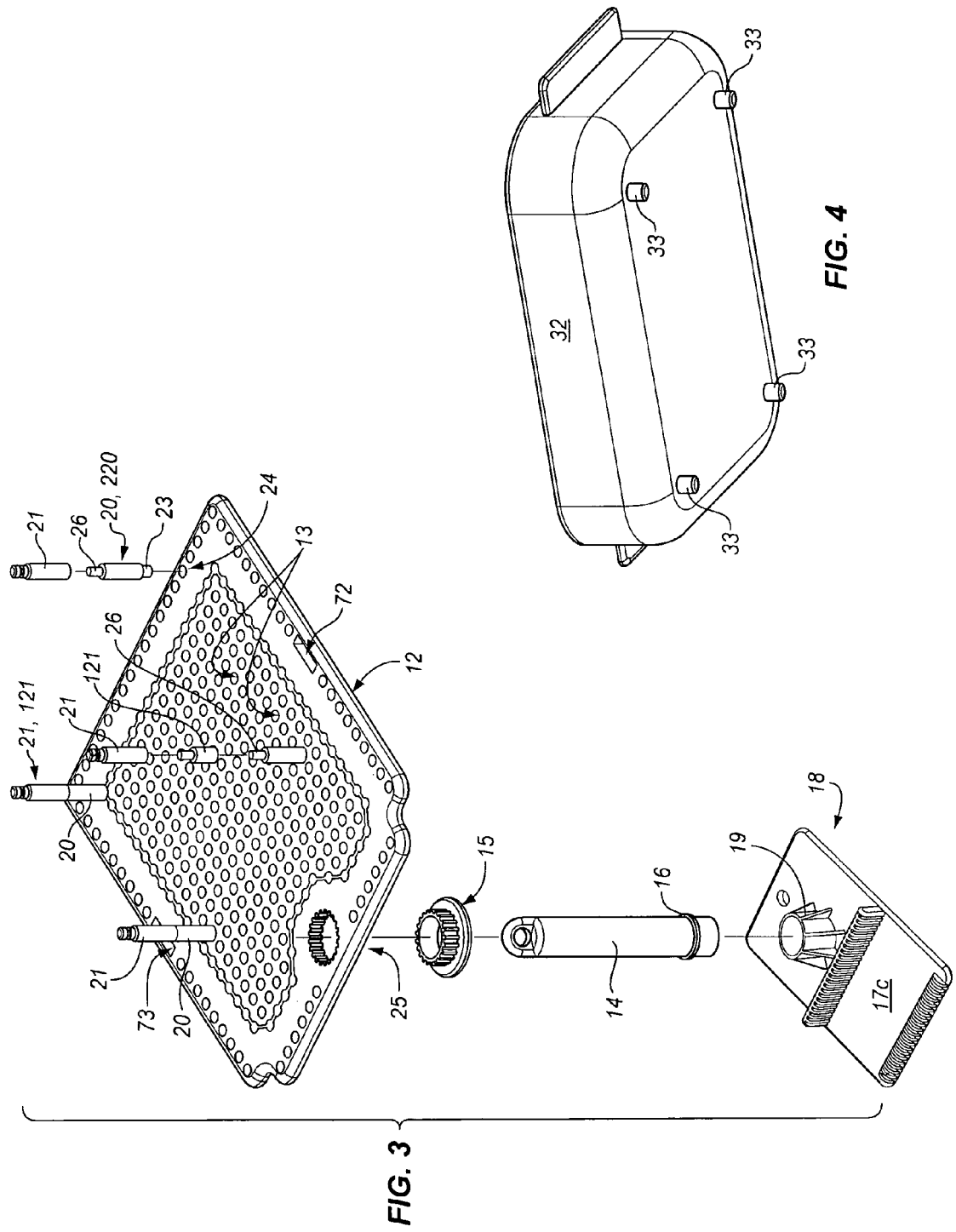

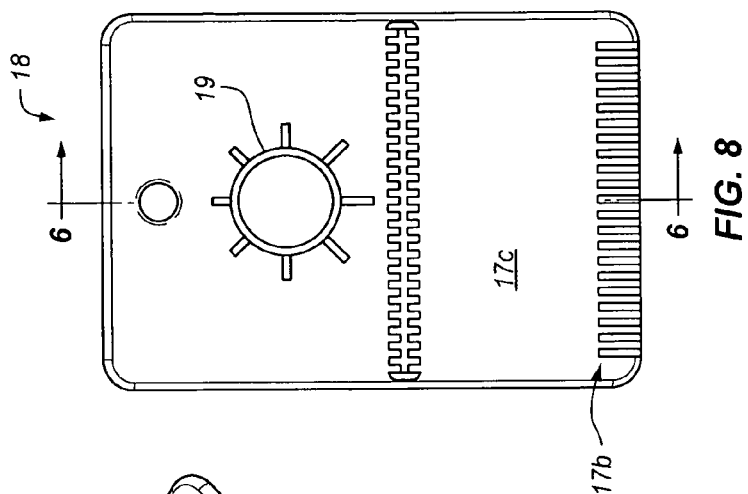
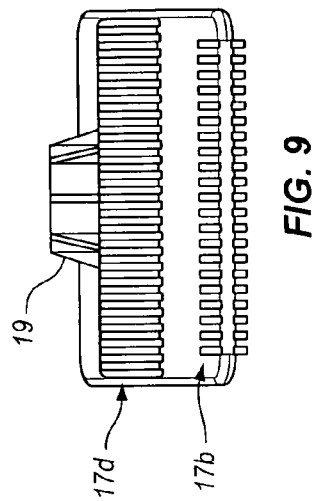
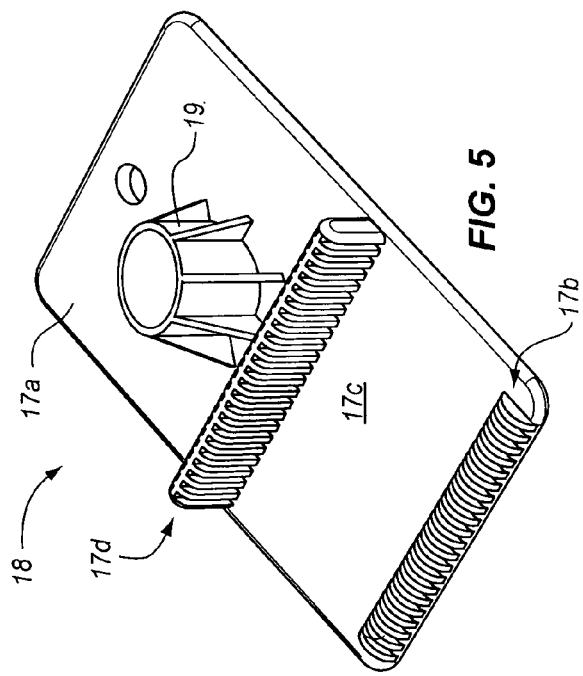
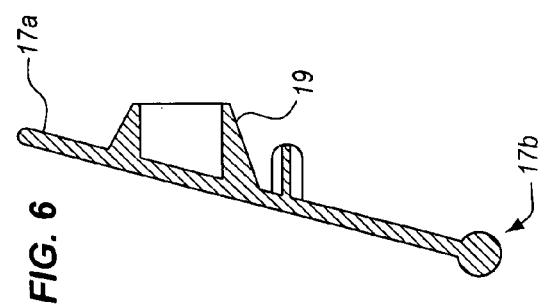
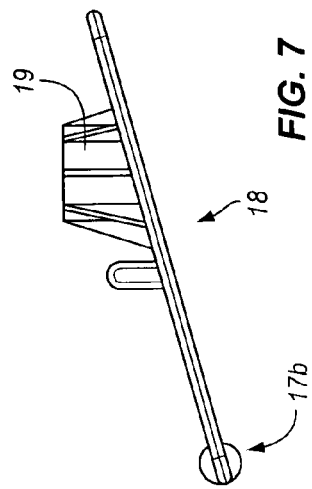

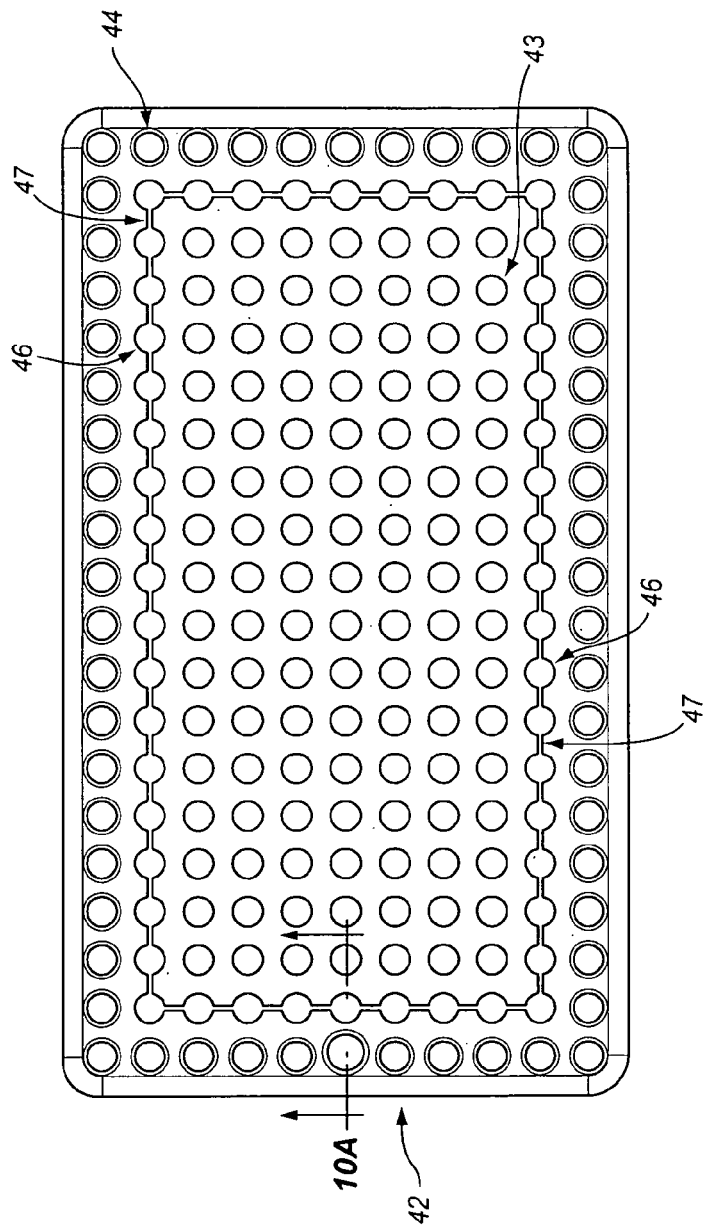
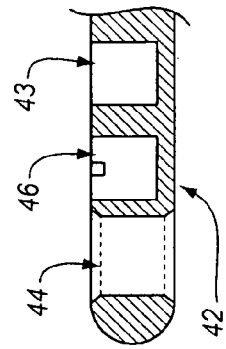

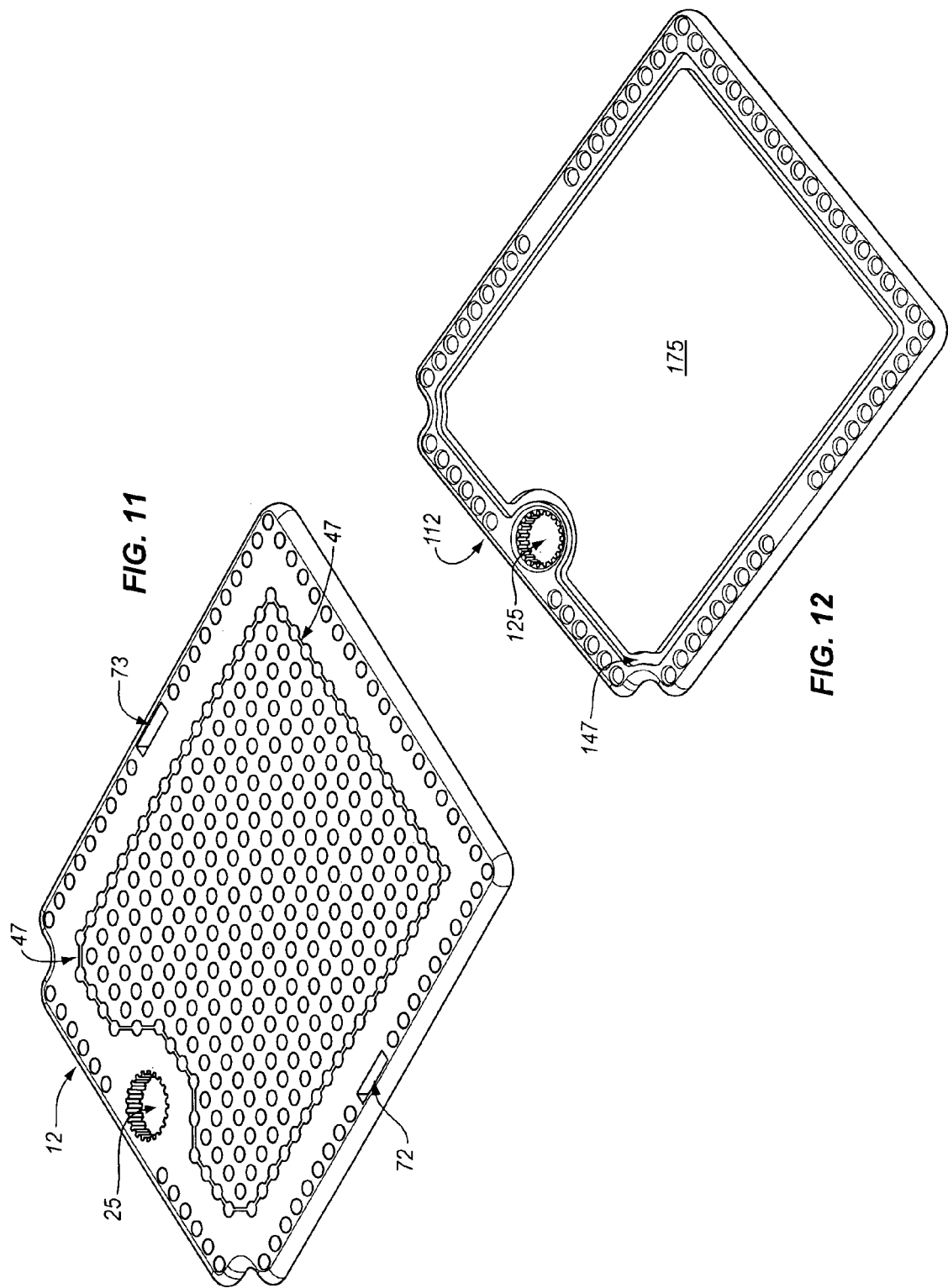

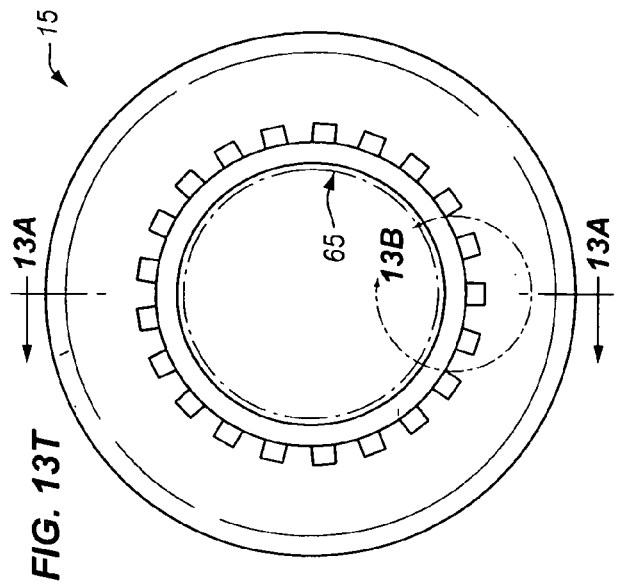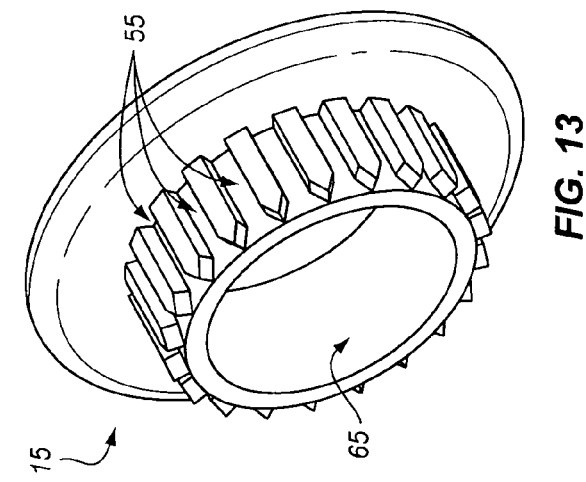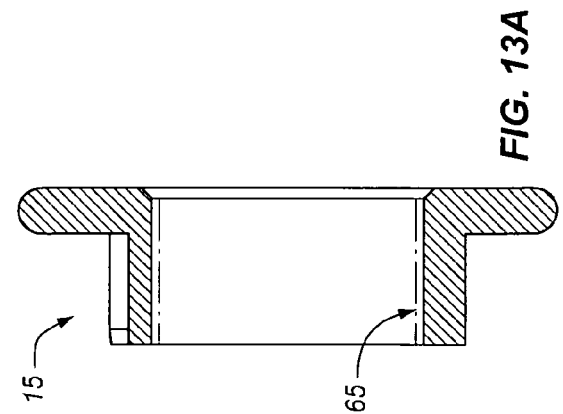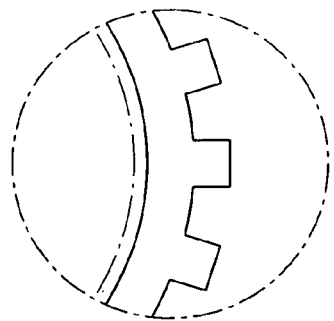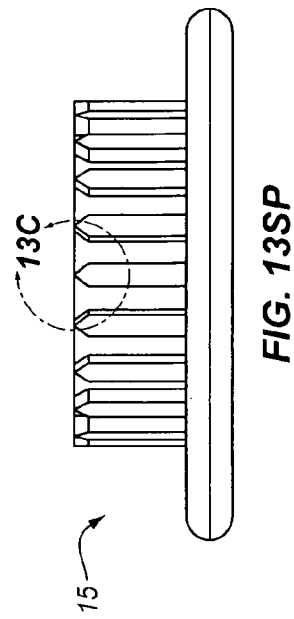

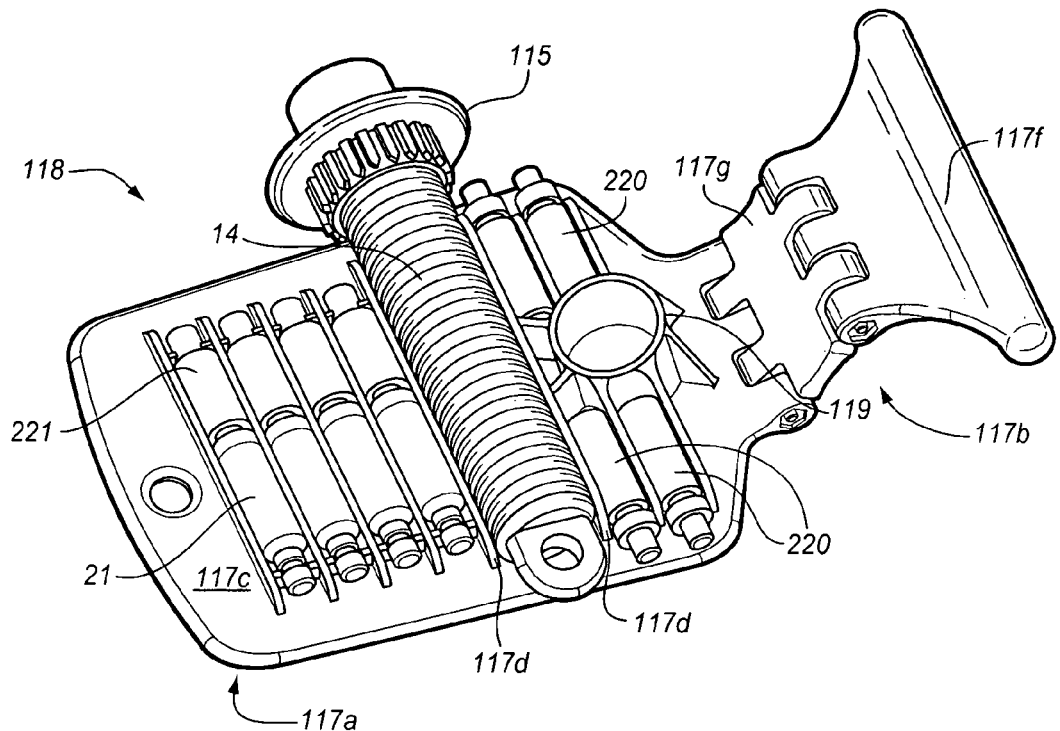
FIG. 24
FIG. 25
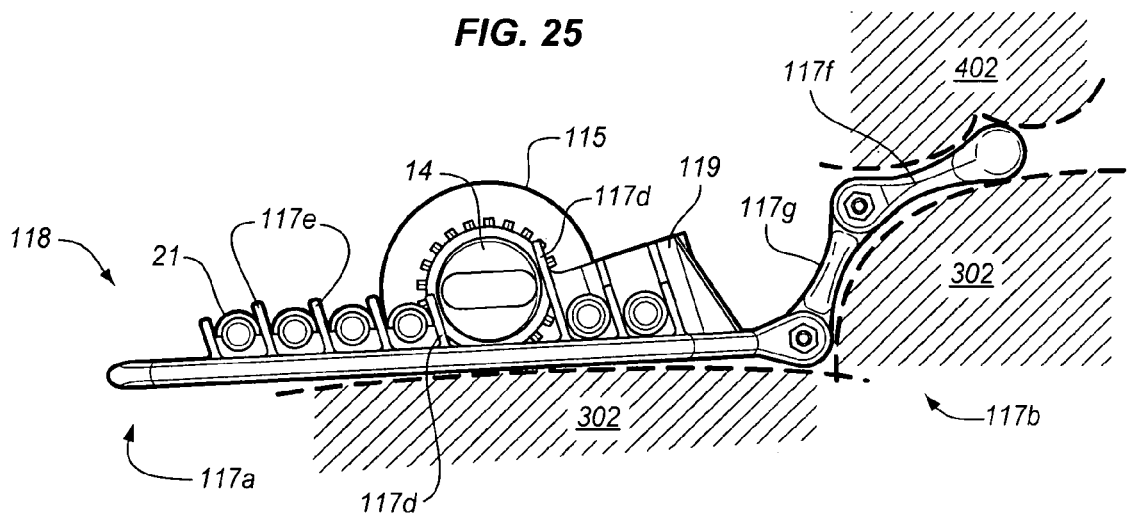

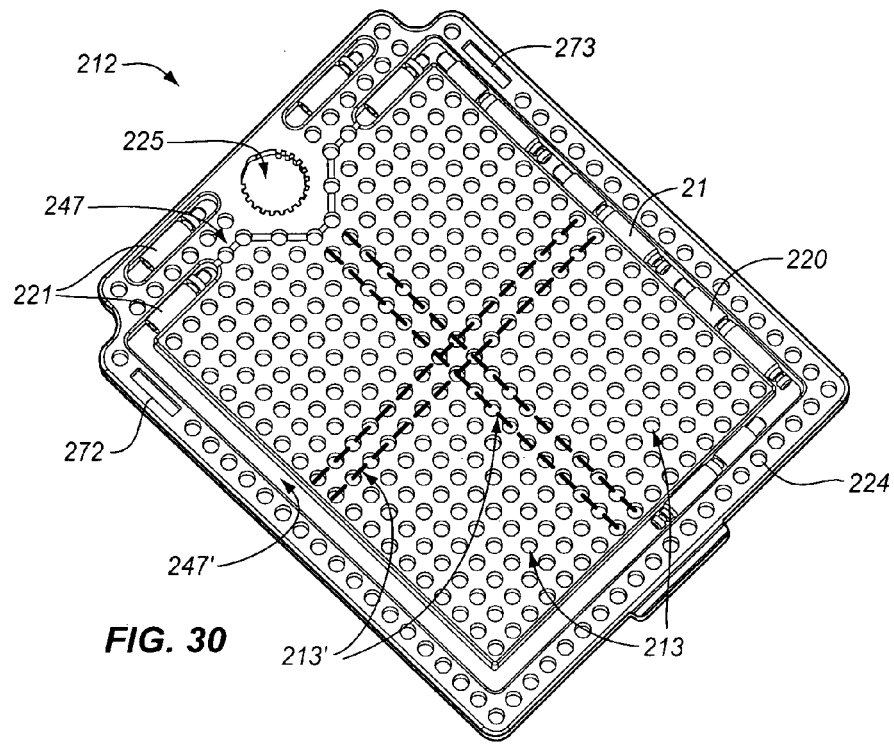
FIG. 30
FIG. 31
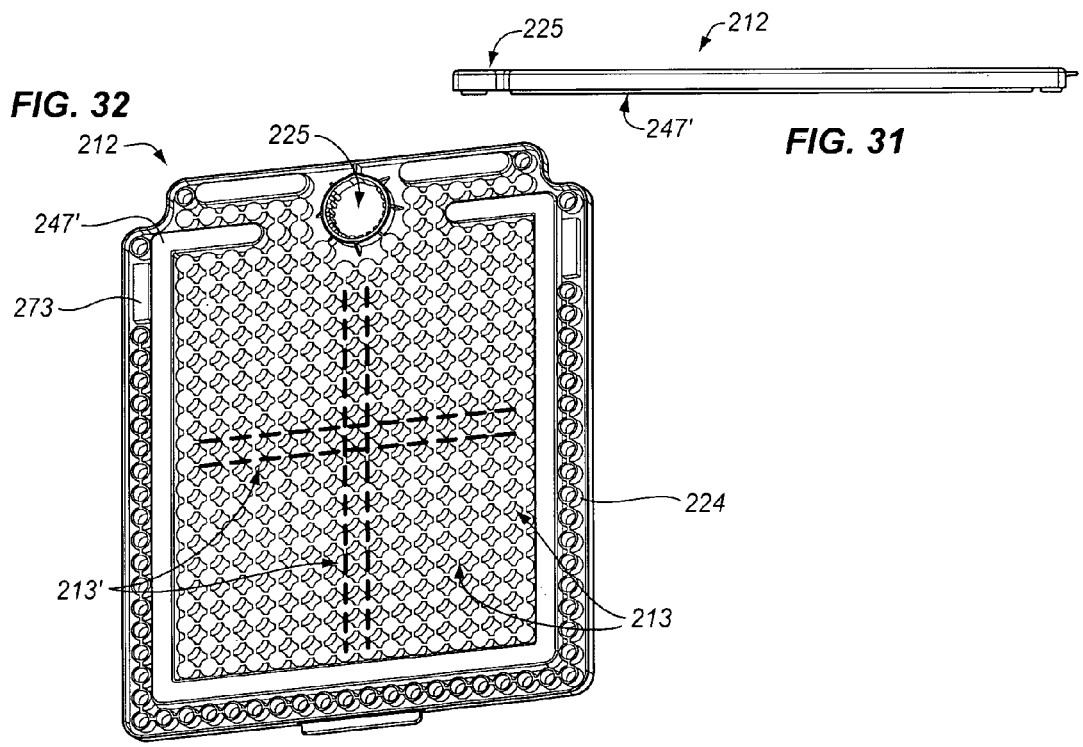
FIG. 32

DEVICE FOR SUPPORTING AN ITEM(S) WHILE IN TRANSIT WITHIN A VEHICLE HAVING PASSENGER SEATING AND WHEN CARRIED FROM LOCATION TO LOCATION

This application claims the benefit of U.S. provisional patent application No. 60/861,403 filed 27 Nov. 2006 for the applicant on behalf thereof, the specification and associated drawings of app. No. 60/861,403 are incorporated herein by reference, providing background technical support to the extent consistent herewith.

BACKGROUND OF THE INVENTION

Field of the Invention

In general, the present invention relates to systems for carrying items from location to location for use by an individual (e.g., an individual waiting on tables) or within a vehicle, such as a passenger car, bus, truck, train, watercraft (motor boat, sail boat, etc.), aircraft (airplane, jet, glider, etc.), amusement park ride (e.g., go-cart, train car), spacecraft, and so on, having passenger seating within. More-particularly, the invention is directed to a unique assembly for supporting, preferably in a generally upright position, one or more items that fit atop a platform, while in transit from location to location by an individual and/or within a vehicle having passenger seating.

The assembly comprises structures that operationally cooperate in a unique fashion to aid in stabilizing the item, esp. while in transit (carried by an individual or within a vehicle):

1) A platform for supporting the item. This platform has an aperture for accepting at least one primary support-post therethrough (also referred to as leveling post) and a plurality of recesses which may be through-holes (punched through the thickness of the platform) or may extend only through a portion of the thickness thereof, each sized for releasably accepting: (a) a lower-end of a stabilizing upright (or, support-pin), and/or (b) one of the 'feet' (or, foot-protuberances) secured to the underside of an item, such as a receptacle (e.g., a container or box, a casserole/cooking pot, plate, bowl and other such receptacle typically used for food storage, transport, or serving, etc.) or other item being supported (e.g., portable computerized device, modular desk component, piece of luggage, glassware, and so on). The platform may be equipped with additional unique features such as: (a) a 'level' indicator for initially leveling the platform while wedging between seat cushions as explained herethroughout, (b) a groove interconnecting an outer series of recesses—or for storing support-pins, end-to-end, when not in use as stabilizing uprights—creating a pathway to catch liquid that spills from a container being supported by the platform (e.g., the groove preferably operational as a 'gravy trough' to collect spillage from a container-item supported by the platform); and (c) one or more solid regions (preferably void of recesses) usable as a cutting board for preparation of meals, flower arrangements, etc.

2) An anchor for releasably securing the assembly between cushion structures within the vehicle—e.g., such that it can be wedged into the spacing between a back support cushion and seat cushion of a passenger vehicle—comprising a base member having a free end and a bulbous end, between which a recessed, e.g., cup-shaped, pedestal extends such that its recess can receive a lower end of the primary support-post (a/k/a leveling post). Additional novel features of the anchor include: support ribs around a periphery of the recessed pedestal; an elongated stop-protrusion extending generally at least partially width-wise across the anchor member to operate as a 'stop' when the anchor is wedged between two cushions (say, the seat and adjacent back cushion); the bulbous end can further comprise one or more hinged-section interconnected with the base member for wedging between two seat cushions; fins along the bulbous end may be included; and bay-protrusions may be integrated to extend, in pairs, width-wise across the base member of the anchor for storing the primary support-post/leveling post, as well as for storing one or more support-pins. As also explained in more detail below, the platform may be used without employing an anchor, along with the stabilizing uprights/support-pins, and placed on the floor of the vehicle or in a trunk area, or carried by food service personnel atop which stabilized food items are placed.

3) Throughout, the primary support-post (a/k/a leveling post) is shown as a threaded cylinder around which a mating internally-threaded leveling ring can twist, forming a subassembly referred to herein as "support-post/leveling ring subassembly." Once the leveling ring has been twisted into place around the circular periphery of the support-post, friction along the engaged and mating threaded section bears the weight of the platform so that the platform, when positioned, does not slide down the support-post. The aperture in the platform intended to receive the support-post/leveling ring subassembly can likewise be generally circular in shape. As shown throughout, by way of example: If the outer diameter of the leveling ring is notched (e.g., shown in FIG. 13 at 55, 13A, 13B, 13C, 13T, 13SP, and FIG. 26 at 155) the aperture (e.g., FIG. 11 at 25, FIG. 12 at 125, FIGS. 30-32 at 225) in the platform for accepting the leveling ring preferably has a mating inner diameter shape for alignment between the support-post/leveling ring subassembly and the platform. When the lower end of the primary support-post is inserted in the recessed pedestal, a lip extending around the periphery of the support-post is located so as to abut the recess. One can further shape the notches in the outside perimeter of the leveling ring to aid when fitting the support-post/leveling ring subassembly into the platform aperture (e.g., FIG. 11 at 25, FIG. 12 at 125, FIGS. 30-32 at 225) likewise notched/shaped.

4) As mentioned above, the platform has a plurality of recesses—one or more of which can be a through-hole (punched through the thickness of the platform) or may extend through only a portion of the thickness of the platform. Each recess is sized for releasably accepting a lower-end of a stabilizing upright (a/k/a support-pin), or a foot-protuberance of an item. Stabilizing uprights may be stacked atop one another: (1) when the platform is employed to support 'taller' items; and/or (2) to accept a $2^{nd}$, $3^{rd}$, etc., platform placed atop an upper-end of a plurality of top-most stabilizing uprights (e.g., see the ½-sized platform 42 in FIGS. 19-21, and a $2^{nd}$ platform 12, which happens to be full-sized, positioned in FIG. 21). One can appreciate: Platforms 42 used atop others (e.g., 12) may have a smaller working area. Further unique, as shown, are alternative stabilizing uprights having circumferential grooves (e.g., see FIG. 16 at 51, FIG. 22 at 250, and FIG. 23 at 151) creating a retention lip (shown, as labeled by way of example with a CHAMFER) into which a retaining band (e.g., a 'rubber band', loop of string/twine, or some such flexible loop—see FIGS. 1 and 2 at dotted line 300) is placed to stretch across an item, such as container 34, atop the platform to hold on a lid (not shown, for simplicity), or to simply further stabilize the item/container during transit (whether carried from location to location by hand or within a vehicle).

One use of the new shelf assembly is to aid in transport of food products being carried within a passenger vehicle—or being carried by hand by an individual—to hold the product securely on a generally level (horizontal) plane so as to prevent spillage. The new shelf assembly can aid in transporting other objects/items (of a size and shape that fits atop the platform) within a vehicle—or being carried by hand—securely, on a generally level plane.

Historical Perspective: Regarding the problem of transporting food products contained in a receptacle within a passenger vehicle: Without properly stabilizing food products (whether the food product includes its own packaging/container or has been placed within a receptacle/container for storage and transport) in a car, truck, SUV, bus, or the like, food products tend to shift, sometimes radically, causing the contents of the container to spill, or causing damage to the food product itself, or damage to the receptacle (such as crushing, breaking, smearing, squashing, etc.). The shifting of food products within a vehicle due to rapid directional movements (a screeching turn, a quick stop, rapid acceleration from a stop, and so on), as well as preferred 'normal' vehicle operation (gentle deceleration before stopping at a stop sign, carefully carved turns, etc.), is well known to anyone who has tried to transport a hot or cold dish to a potluck supper or picnic. Drivers who are distracted while attempting to manually monitor (and hold!) items in place on a seat, can be a road safety hazard. Employing the unique assembly, described herein, aids in stabilizing food product containers during transit. Not only does using the unique assembly help ensure the food does not spill out from its container, but aids in preventing a rapid shift in position, and eventual slipping—or completely falling over—off a seat cushion. Other items that may be supported by the assembly include, without limitation: computer laptop or other portable computerized device, modular desk component, luggage, glassware, boxes (whether with fragile contents), crates, and so on. The list of items is very long, indeed. The design of the unique assembly, permits use of the same platform, anchor member, and support-pins to hold items of a variety of different shapes.

The assembly may be used in conjunction with both front and rear passenger seating of a wide variety of vehicles, including those identified above. When not using the anchor member, the platform may be used with the stabilizing uprights (support-pins)—no primary support-post needed in this case—and placed on the floor of either the front or rear passenger area, or in the trunk or a hatch-back space, of the vehicle; or the platform with inserted uprights can be carried by hand from one location to another. The available space—for example on the trunk floor of a vehicle in which the assembly is placed—must be sufficiently large, dimensionally, to accommodate the size of the platform. In addition, the platform member may be used as a cutting board (preferably, in the case of cutting foodstuff, an outer top cutting surface would be made of food-grade, agency approved material). Note here: For purposes of safety of a human (or other animal) passenger, that the assembly of the invention is not intended to be used as seating for human or other animal passengers, unless suitable, requisite safety belting or safety harnesses/harnessing is used around the passenger.

SUMMARY OF THE INVENTION

Briefly described, one characterization of the invention includes an assembly for supporting at least one item while in transit within a vehicle having cushioned passenger seating. The assembly used during transit within a vehicle, has:
  (a) A platform (for supporting the item) that has an aperture for receiving at least one primary support-post therethrough, and a plurality of recesses, each sized for releasably accepting a shape such as (1) a lower-end of a stabilizing upright/support-pin, and/or (2) a foot-protuberance on the underside of the item.
  (b) An anchor for releasably securing the assembly between cushion structures within the vehicle is used (e.g., such that it can be wedged into the spacing between, say, a back support cushion and seat cushion of a passenger vehicle). The anchor comprises a base member having a free end and a bulbous end, between which a pedestal extends having a recessed shape, such as a cup, for receiving a lower end of the primary support-post. The bulbous end can be fabricated integral with the base member, or made of one or more hinged-sections interconnected with the base member—in either case, the bulbous end is preferably sized to fit wedged between adjacent cushion structures of the vehicle.
  (c) At least a portion of the outer surface of the primary support-post is preferably threaded, around which a mating internally-threaded leveling ring can twist.
  (d) An inner wall of the aperture in the platform for receiving the support-post and the leveling ring subassembly, is shaped to mate with an outer diameter of the leveling ring. For example, if the outer diameter of the leveling ring is notched (e.g., shown in FIG. 13 at 55, 13A, 13B, 13C, 13T, 13SP, and FIG. 26 at 155) the aperture (e.g., FIG. 11 at 25, FIG. 12 at 125, FIGS. 30-32 at 225) in the platform is preferably likewise notched for a close mechanical fit providing a mechanism by which an alignment can be done between the support-post/leveling ring subassembly and the platform. Additionally, when the lower end of the primary support-post is inserted in the recess/cup of the pedestal, a lip extending around the periphery of the support-post is located to abut a periphery of the cup.

Also characterized, is an assembly for supporting at least one item while in transit from location to location—such as can be held by an individual. This assembly has:
  (a) a platform (for supporting the item) having a plurality of recesses, each sized for releasably accepting a shape selected from the group consisting of (1) a lower-end of a stabilizing upright, and (2) a foot-protuberance on the underside of the item;
  (b) the plurality of recesses extend through only a portion of a thickness of the platform; and
  (c) a second-type stabilizing upright shaped for stacking atop the first stabilizing upright; each of these second-type stabilizing uprights can have a circumferential groove (e.g., see FIG. 16 at 51, FIG. 22 at 250, and FIG. 23 at 151) creating a retention lip (shown, as labeled by way of example with a CHAMFER) into which a retaining band (e.g., a 'rubber band' or such—see FIGS. 1 and 2 at dotted line 300) is placed to stretch across the item when being supported atop the platform.

The item can be one of more of a wide variety of receptacles typically used in connection with foodstuff, such as a container or box, a casserole/cooking pot, plate, bowl and other such receptacle typically used for food storage, transport, or serving; or the item could be any of a wide variety of items that are transported, such as a laptop, palmtop, or other portable computerized device; modular desk component; piece of luggage; glassware; and so on. The platform may be equipped with additional novel features, such as: a 'level' indicator; a groove interconnecting a series of the recesses located adjacent one another, creating a pathway for liquids that flow atop the platform (e.g., recesses in communication around an outer area of the platform—or, a groove sized to store support-pins, end-to-end, when not in use as stabilizing uprights—will thus become operational as a 'gravy trough' to collect spillage from a container-item being supported atop the platform); and one or more solid region preferably void of the recesses and usable as a cutting or preparation surface (for prep of meals, flower arrangements, and so on).

The anchor may be equipped with additional novel features, such as: support ribs around a periphery of the pedestal; an elongated stop-protrusion extending along a width-wise direct across the anchor member to operate as a 'stop' when the anchor is wedged between two cushions (say, a seat and a back cushion); the bulbous end further comprises one or more hinged-section interconnected with the base member for wedging between two seat cushions; a plurality of fins extending along the bulbous end; and bay-protrusions may be integrated to extend, in pairs, width-wise across the base member of the anchor for storing the primary support-post/ leveling post, as well as shorter protrusion pairs for storing one or more support-pins, end-to-end.

One or more of the plurality of recesses can be a through-hole punched through a thickness of the platform and, at least one or more of the plurality of recesses can extend through only a portion of the platform thickness, such that it does not extend fully through the thickness. For example, the majority of recesses can be made of a depth less than a couple of rows which are kept to a selected thickness of the platform: Labeled in FIGS. 30-31 are two sets of parallel rows of recesses 213' having a greater depth than the other recesses 213. The two sets of parallel rows of recesses 213' are orthogonal to each other and of a depth of that of groove 247' (sized for temporary storage of support-pins 21, 220, 221), providing stability to the platform 212 when set on a countertop. A second-type of stabilizing upright, shaped for stacking atop the first stabilizing upright, can be used. Stacked uprights can be employed to support 'taller' items and/or to accept a $2^{nd}$, $3^{rd}$, etc., platform(s) of a variety of shapes and sizes placed atop an upper-end of a plurality of top-most stabilizing upright (for example, see platform 42 in FIGS. 19-21, and a $2^{nd}$ platform 12 positioned in FIG. 21). The second-type stabilizing upright preferably has a circumferential groove (e.g., see FIG. 16 at 51, FIG. 22 at 250, and FIG. 23 at 151) creating a retention lip (shown, as labeled with a CHAMFER) into which a retaining band (e.g., a 'rubber band' or some such flexible loop—see FIGS. 1 and 2 at dotted line 300) is placed to stretch across an item, such as container 34, atop the platform to hold down a lid (not shown, for simplicity), or to simply further stabilize the item/container during transit.

BRIEF DESCRIPTION OF DRAWINGS AND ATTACHMENTS, IF ANY

For purposes of illustrating the innovative nature, flexibility and versatility of design of the new assembly and associated system set forth herein, the following background references and figures are included. One can readily appreciate the advantages as well as novel features that distinguish the instant invention from conventional cargo-carry-support systems. The figures as well as any incorporated technical materials have been included to communicate the features of applicant's innovative apparatus and system by way of example, only, and are in no way intended to limit the disclosure hereof. Any enclosure, identified and labeled an ATTACHMENT, is hereby incorporated herein by reference for purposes of providing background technical information.

FIG. 1 is an isometric sketch representing an apparatus 10 that has a platform 12 supporting an item (e.g., receptacles 32 and 34), and an anchor 18, the bulbous end 17b of which is intended for 'tucking in' between the spacing that generally exits between a back cushion and a seat cushion (neither of which are shown, here, for simplicity).

FIG. 3 is an exploded assembly isometric of an apparatus, similar to the assembly shown in FIG. 1.

FIG. 4 is an under-side isometric view of the item 32 also shown in FIG. 1.

Figure 1:
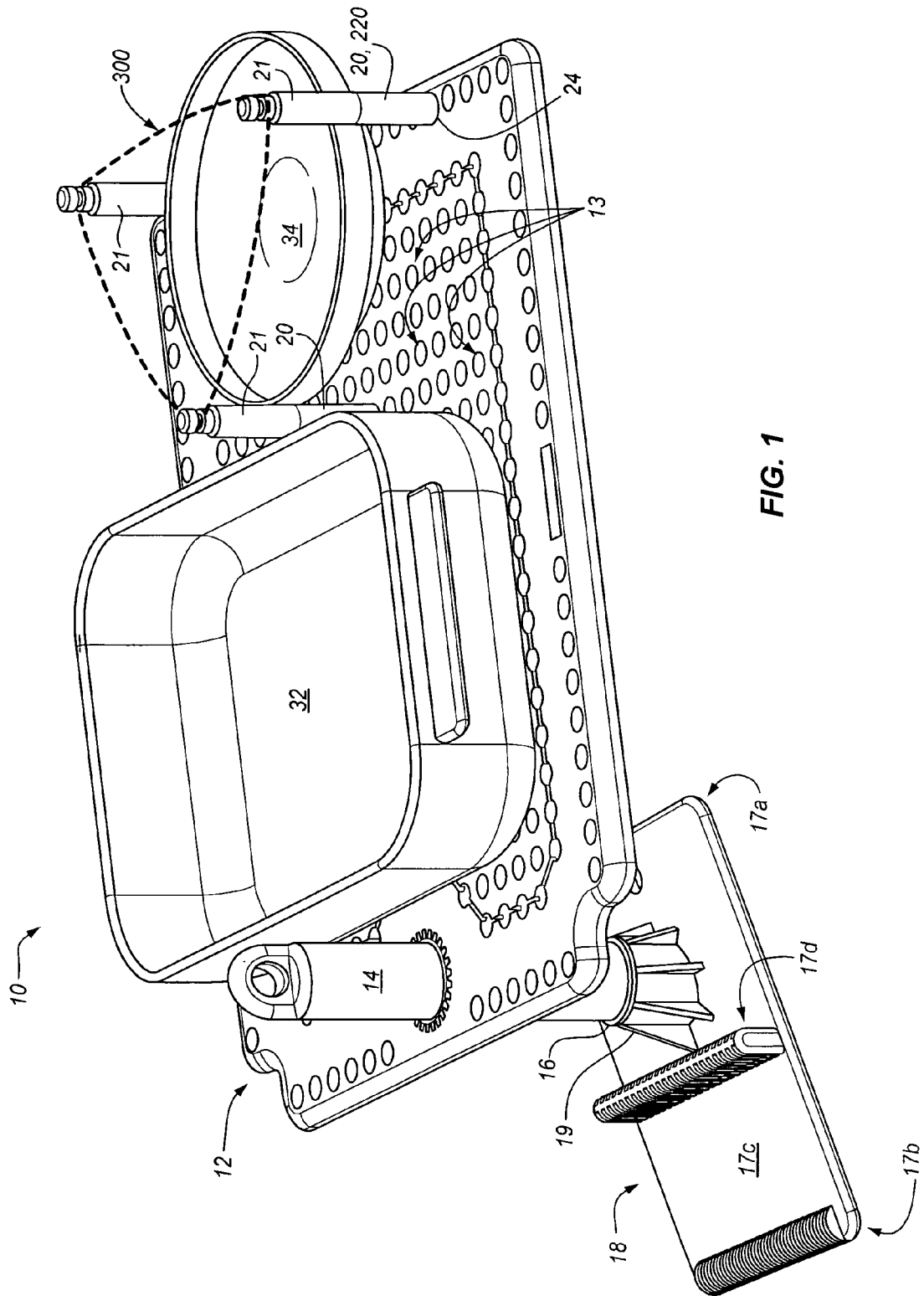

FIGS. 5-7 depict various views of the anchor subassembly depicted in FIG. 1 at 18: FIG. 5 is an isometric view; FIG. 6 is a sectional view; FIG. 7 is a side plan view; FIG. 8 is a top plan view; and FIG. 9 is a front plan view.

FIGS. 10, 10A, 10B depict various views of a platform subassembly 42: FIG. 10 is a top plan view; FIG. 10A is a partial sectional view of platform taken along A-A of FIG. 10, depicting three recesses 44 (a through-hole), 46 (interconnected via trough 47), and inner recess 43 (the remaining array of recesses); and FIG. 10B is an end view of the platform 42.

FIGS. 11-12 depict alternatives: FIG. 11 is of platform 12, also shown in FIGS. 1-3; and FIG. 12 is of platform 112 having no interior recesses.

Figure 2:
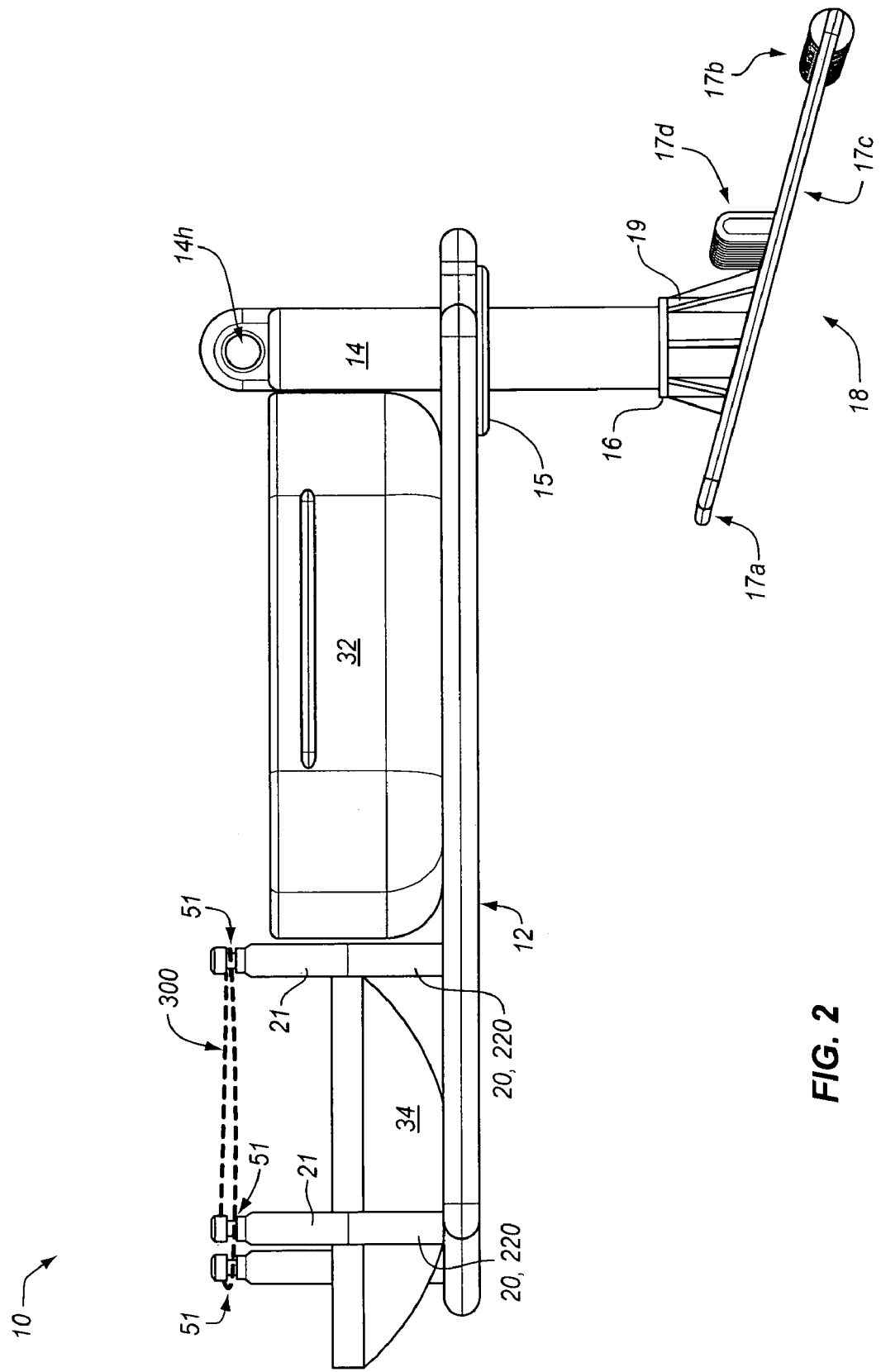
FIG. 2 is a side plan view of apparatus 10 (taken from the back of FIG. 1 sketch).

FIGS. 13, 13A, 13B, 13C, 13T, and 13SP depict various views of the leveling ring assembly depicted in FIG. 2-3 at 15: FIG. 13 is an isometric view; FIG. 13A is a mid-sectional view; FIG. 13T is a top plan view of FIG. 13; FIG. 13B details the shape of intermesh projections 55 (taken within circular area labeled "B" in FIG. 13T); FIG. 13SP is a side plan view of FIG. 13; and FIG. 13C details the intermesh projections 55 within circular area "C" in FIG. 13SP.

Figure 14A:
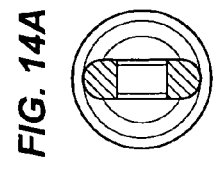
Figure 14B:
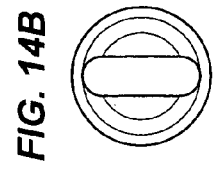
Figure 14:
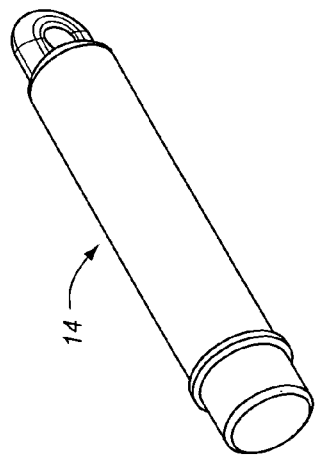
Figure 14S:
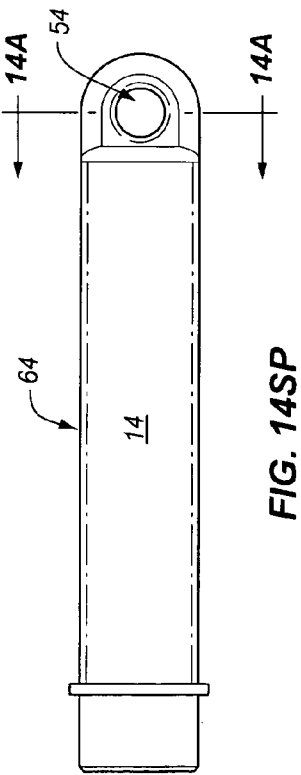

FIGS. 14, 14SP, 14B, and 14A depict various views of the primary support-post (e.g., a/k/a leveling post) 14, also shown in FIGS. 1-3: FIG. 14 is an isometric;

FIG. 14SP is a side plan view of FIG. 14; FIG. 14B is an end view; and FIG. 14A is a sectional taken along A-A of FIG. 14SP.

Figure 15:
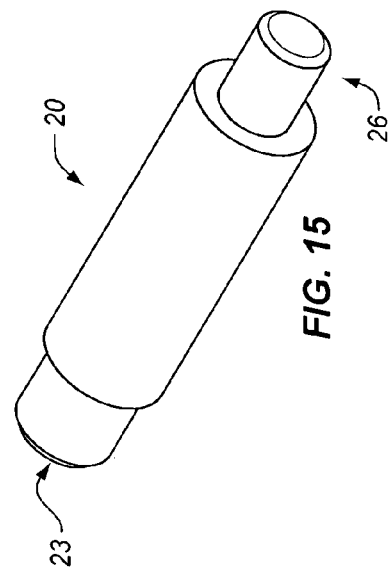
Figure 15S:
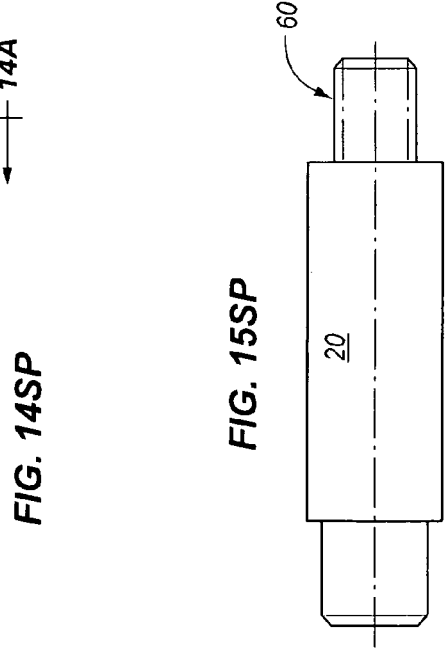

FIGS. 15 and 15SP depict various views of a base stabilizing upright 20, also shown in FIGS. 1-3 and elsewhere: FIG. 15 is an isometric; and FIG. 15SP is a side plan view of FIG. 15.

Figure 16:
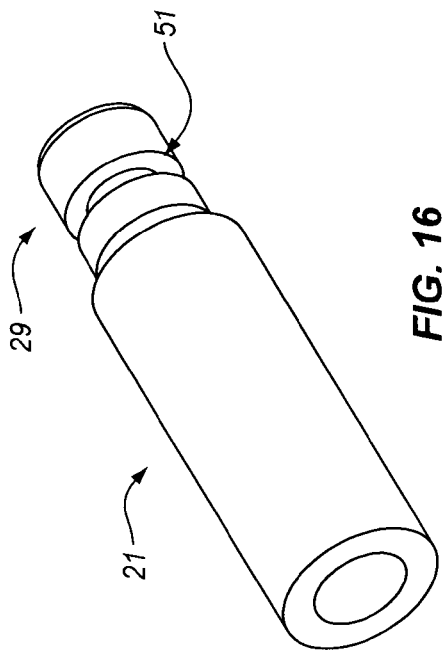
Figure 16S:
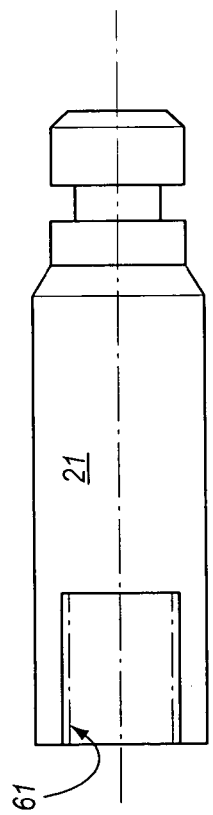

FIGS. 16 and 16SP depict various views of an extender stabilizing upright 21, also shown in FIGS. 1-3 and elsewhere: FIG. 16 is an isometric; and FIG. 16SP is a side plan view of FIG. 16.

Figure 17:
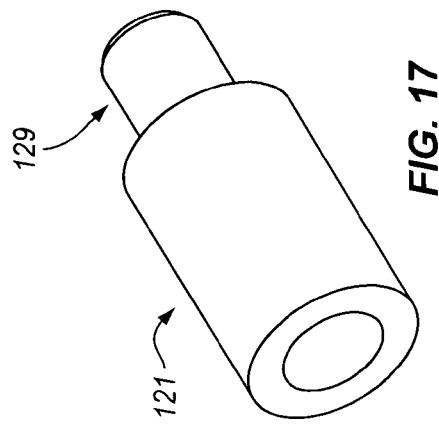
Figure 17S:
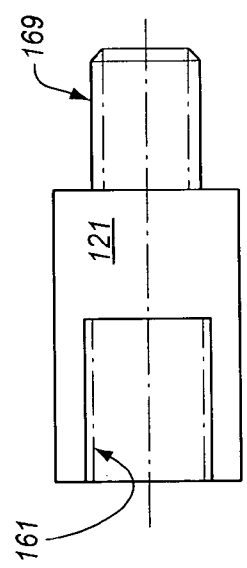

FIGS. 17 and 17SP depict various views of an extender stabilizing upright 121, also labeled in FIGS. 1-3 and elsewhere: FIG. 17 is an isometric; and FIG. 17SP is a side plan view of FIG. 17.

Figure 18:
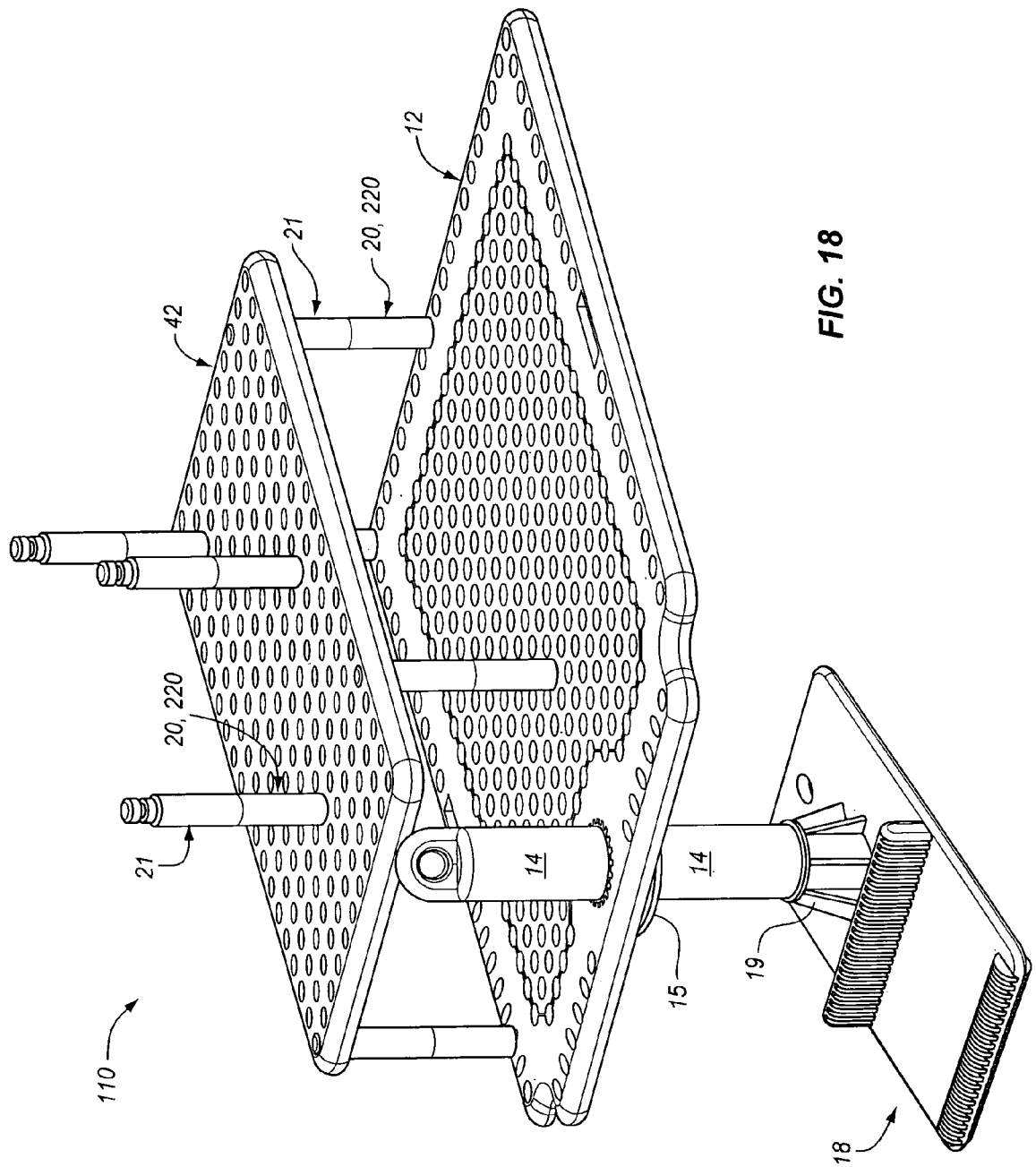

FIG. 18 is an isometric sketch representing an alternative apparatus 110 having platform 12 as well as a second platform 42 positioned above and supported atop pairs of uprights 20/220, 21 (which fit into recesses in platforms 12, 42), primary support-post/leveling post 14, and anchor 18.

Figure 19:
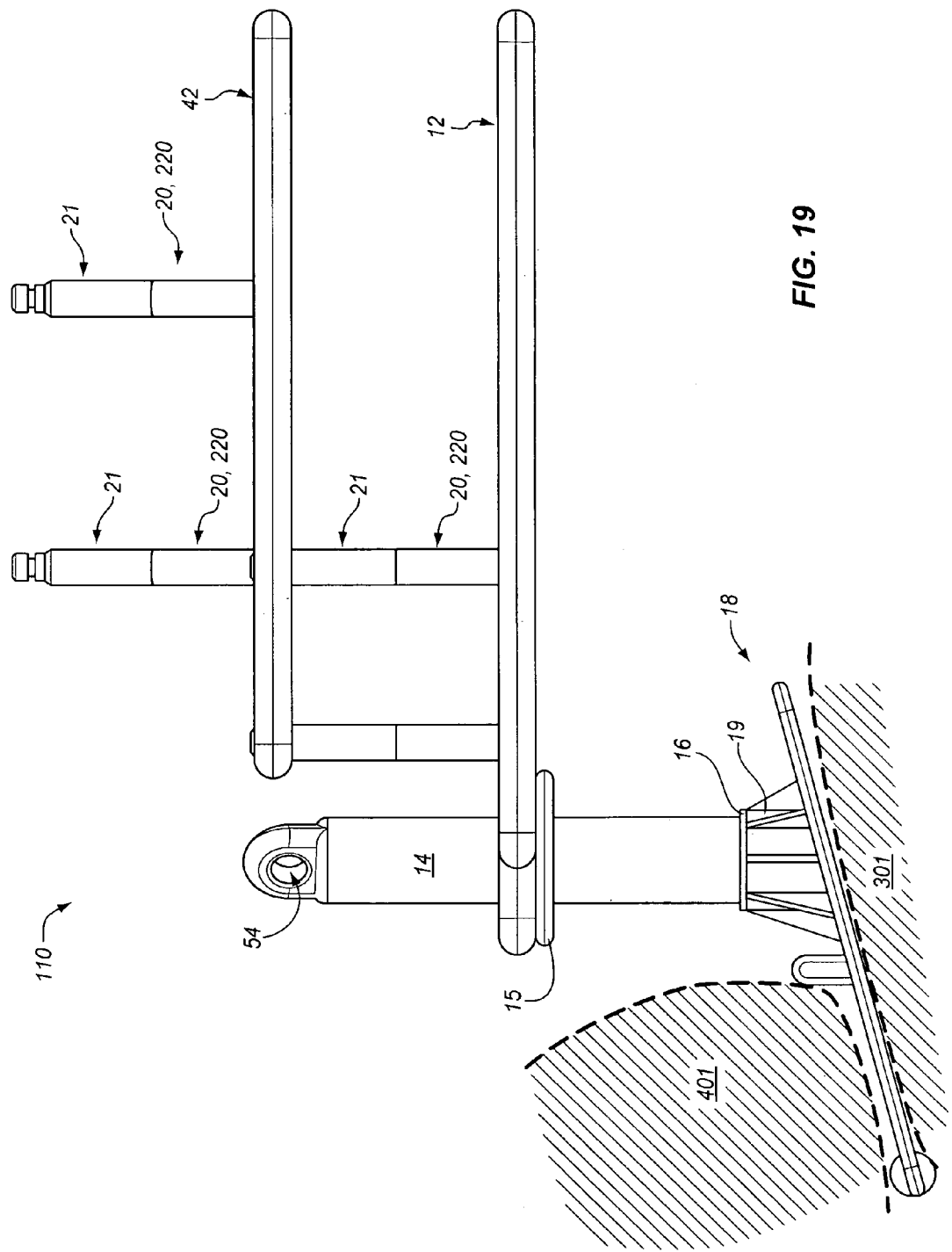

FIG. 19 is a side plan view of apparatus 110 (taken from the front of the FIG. 18 sketch).

Figure 20:
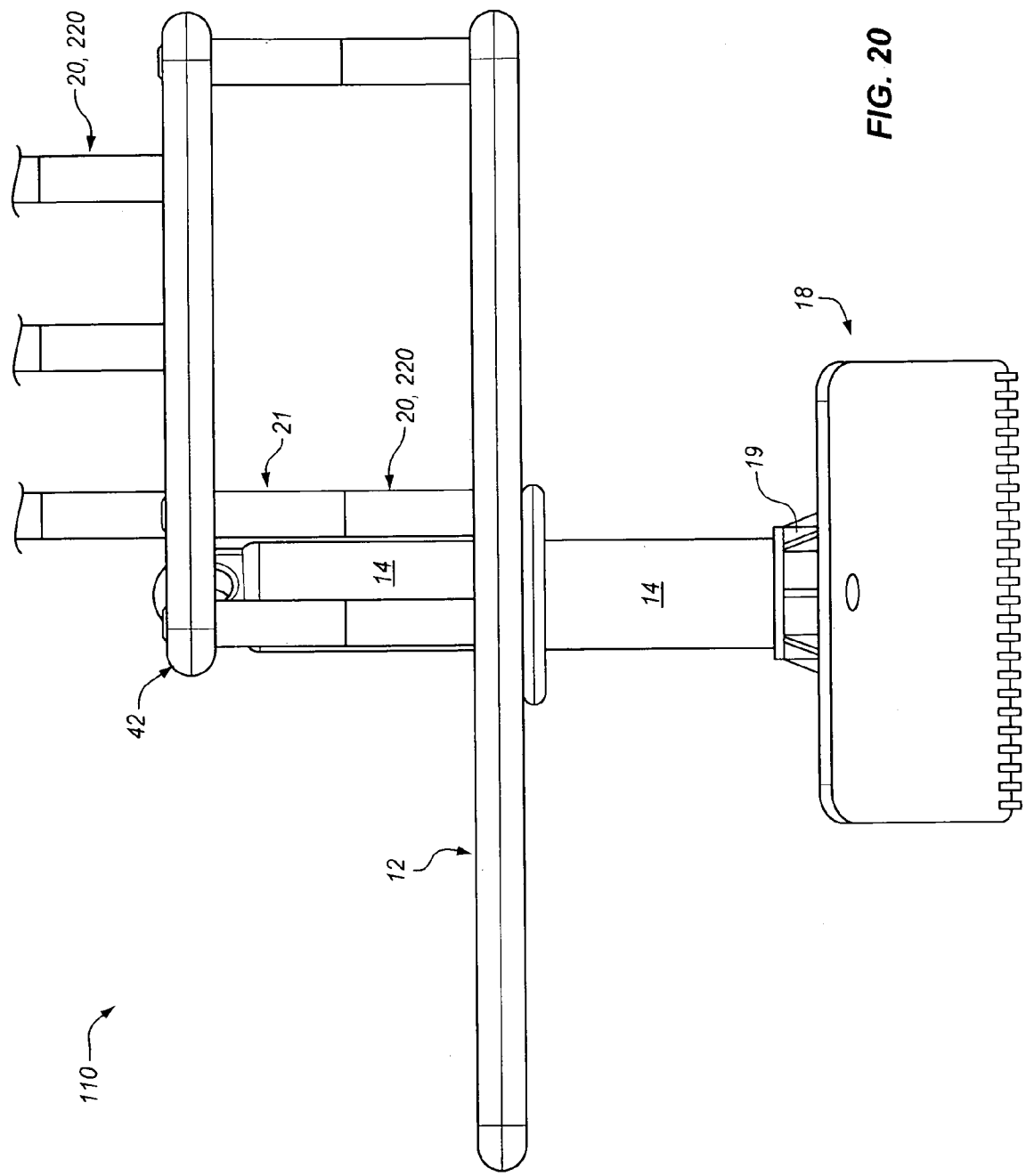

FIG. 20 is a front plan view of apparatus 110 looking in from the right side of the FIG. 18 sketch (so that the platforms 12, 42 are in front of anchor 18).

Figure 21:
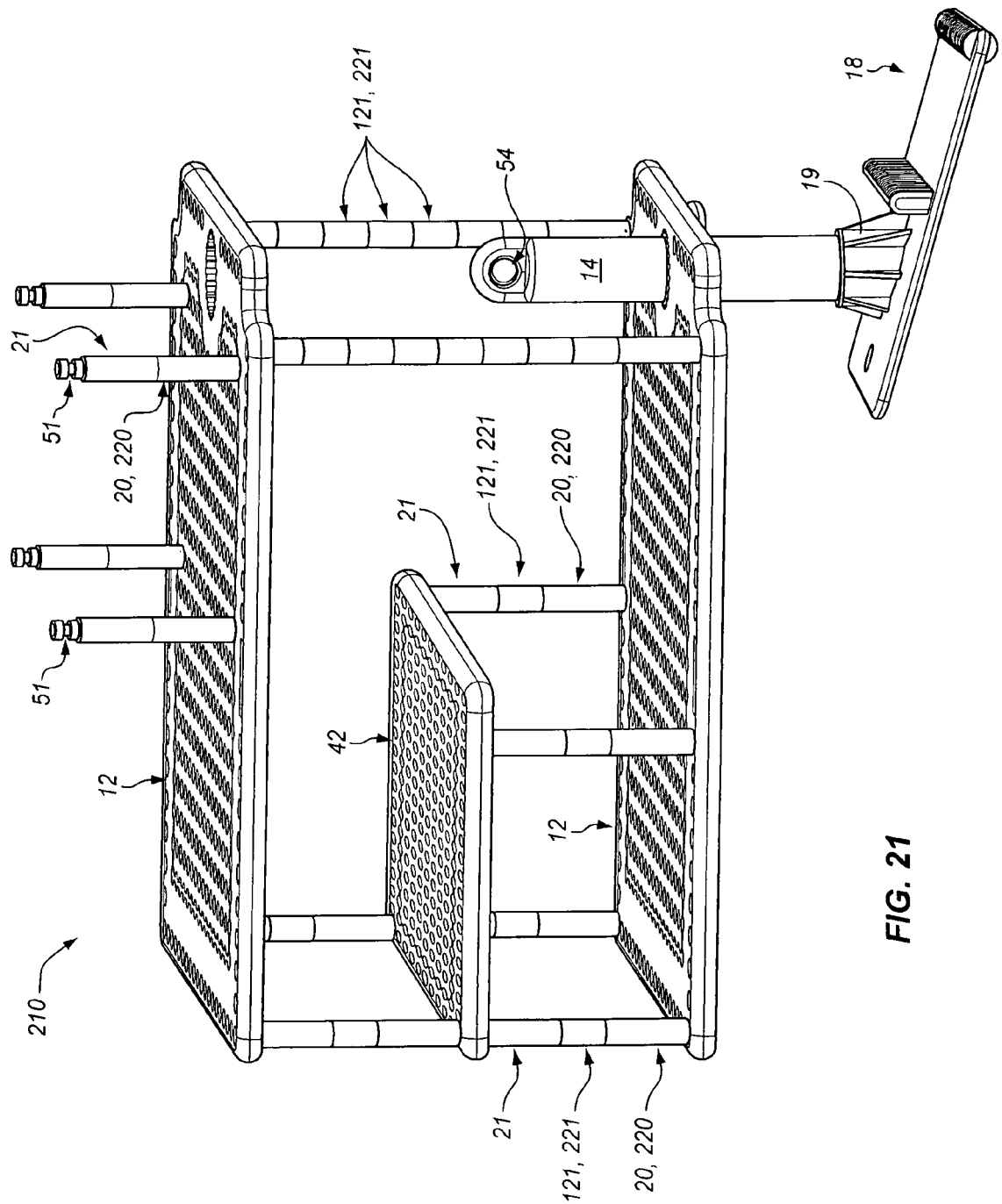

FIG. 21 is an isometric sketch representing an alternative apparatus 210 having a lower platform 12, a mid-platform 42 positioned at midlevel and supported atop triplets of uprights 20/220, 121/221, 21 (which fit into recesses in platforms 12, 42), and a top-platform 12 positioned at highest level, being supported atop several stacked uprights.

Figure 22:
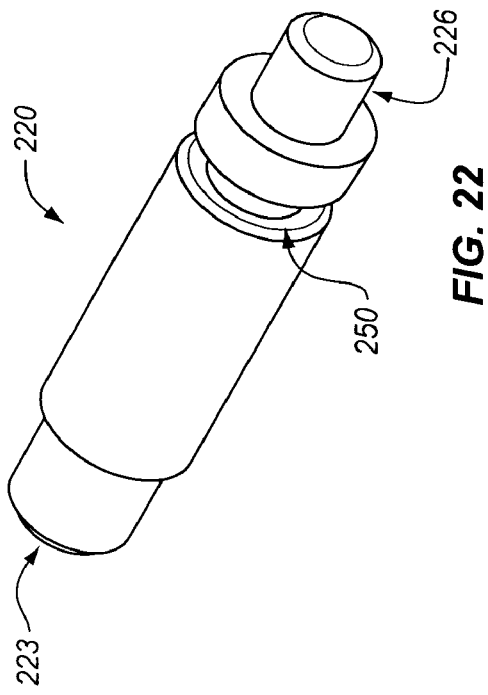
Figure 22S:
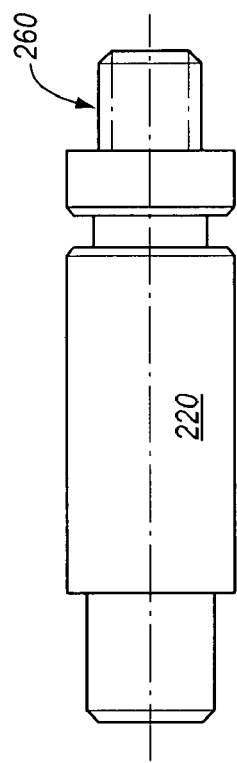

FIGS. 22 and 22SP depict various views of an alternate base stabilizing upright 220, also shown elsewhere: FIG. 22 is an isometric; and FIG. 22SP is a side plan view of FIG. 22.

Figure 23:
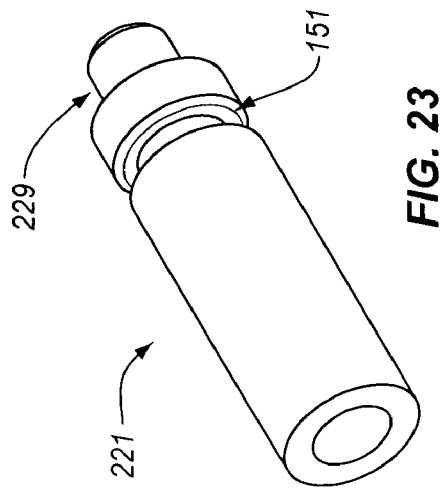
Figure 23S:
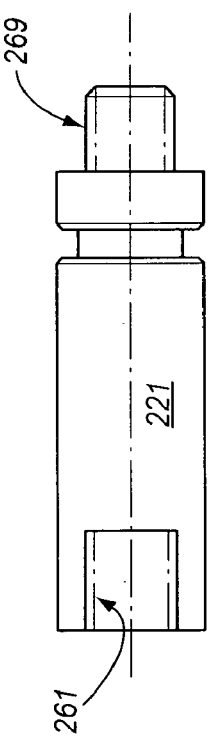

FIGS. 23 and 23SP depict various views of an alternate extender stabilizing upright 221, also shown elsewhere: FIG. 23 is an isometric; and FIG. 23SP is a side plan view of FIG. 23.

FIGS. 24-25 depict two views of an alternative anchor subassembly 118 on which a support-post/leveling ring subassembly 14/15 in FIGS. 24 and 14/115 in FIG. 25 has been stored/stowed between a pair of bay-protrusions 117d and several support-pins 21, 221, 220 are stored in end-to-end fashion in-between pairs of bay-protrusions (not labeled for simplicity): FIG. 24 is an isometric view; and FIG. 25 is a side plan view.

Figure 26:
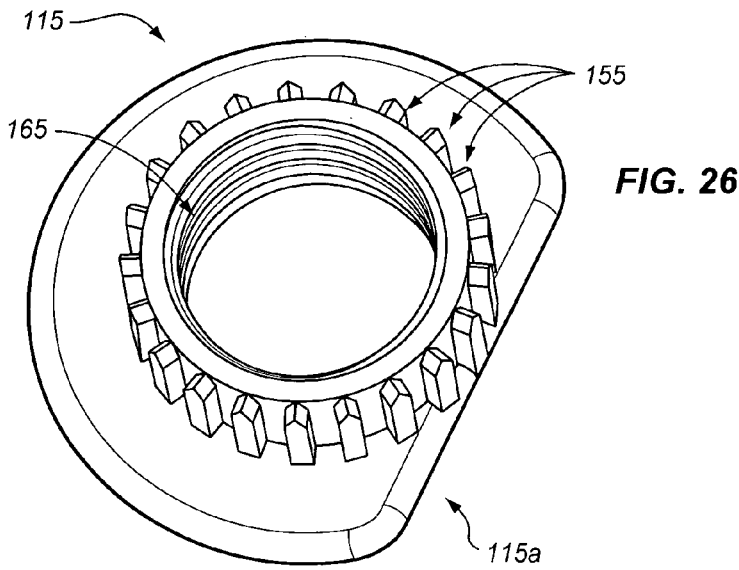

FIG. 26 is an isometric view of an alternative leveling ring assembly 115 to that depicted elsewhere at 15.

Figure 27:
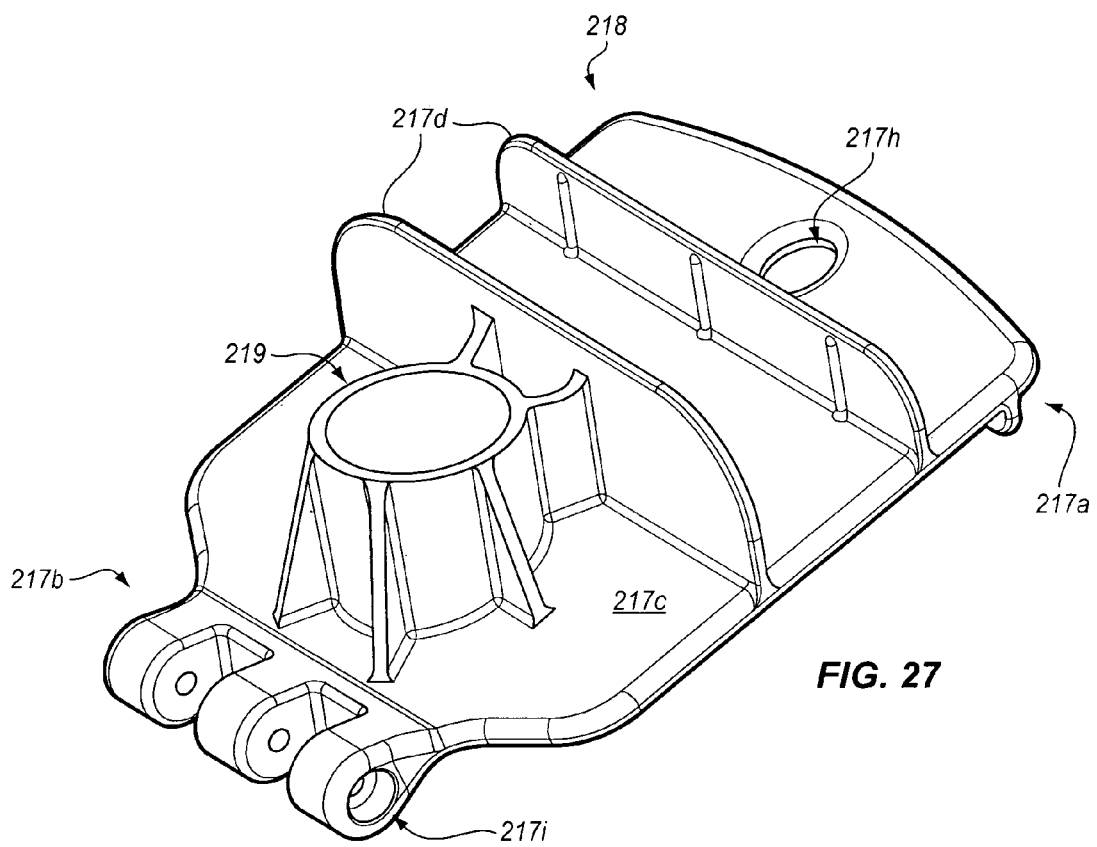
Figure 28:
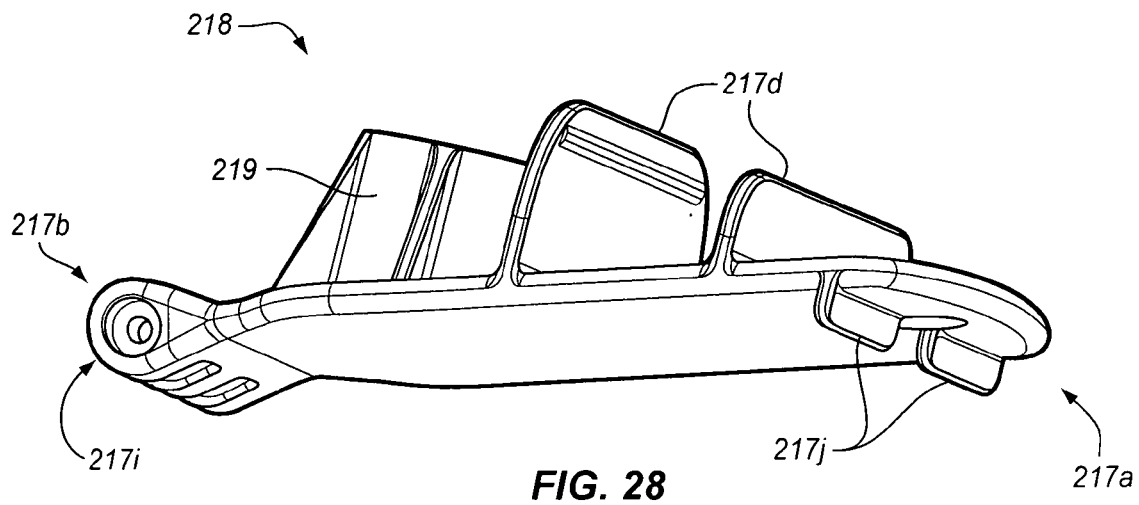
Figure 29:
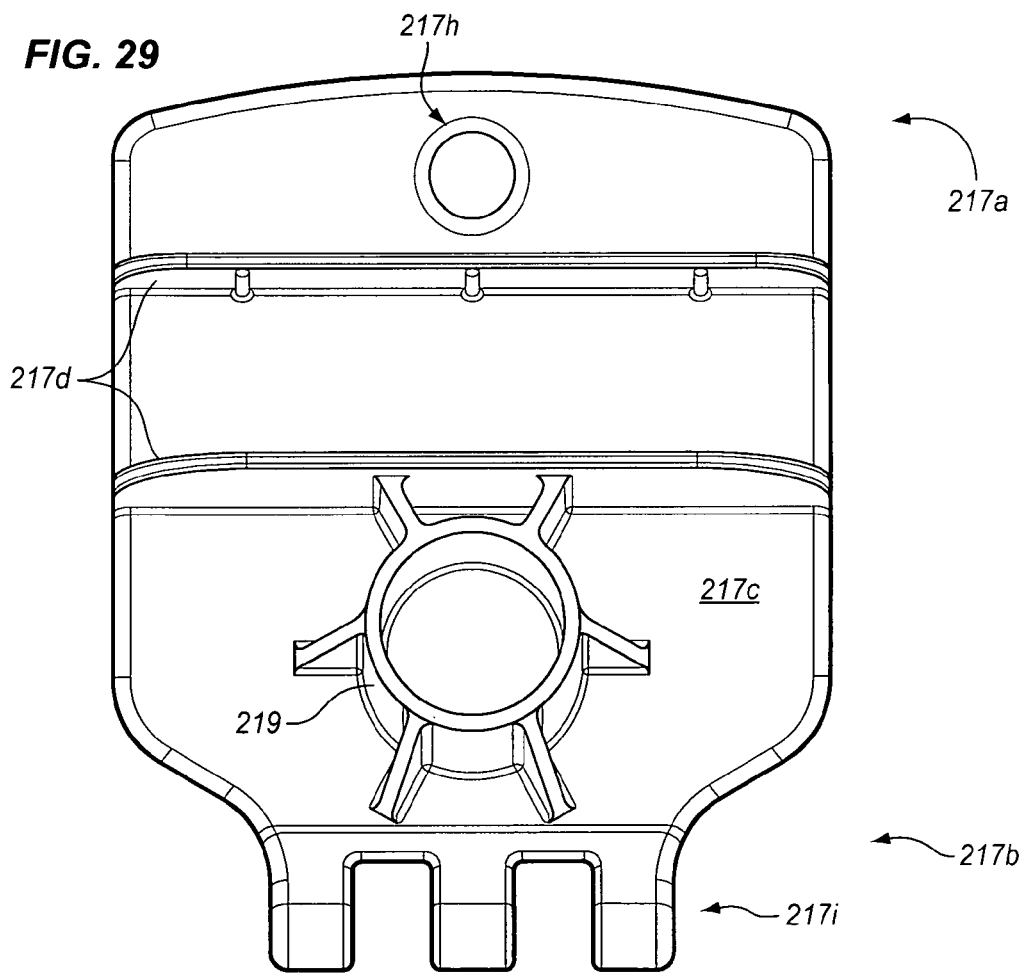

FIGS. 27-29 depict various isometric views of yet another alternative anchor subassembly 218, including a pair of bay-protrusions 117d between which a support-post/leveling ring subassembly (shown elsewhere at 14/15) may be stowed as shown in FIGS. 24-25. FIG. 27-28 are isometric views; FIG. 29 is a top plan view.

FIGS. 30-32 depict various isometric views of yet another alternative platform member 212: FIG. 30 is a top plan isometric; FIG. 31 is a side plan view; and FIG. 32 is a bottom plan view.

Figure 33:
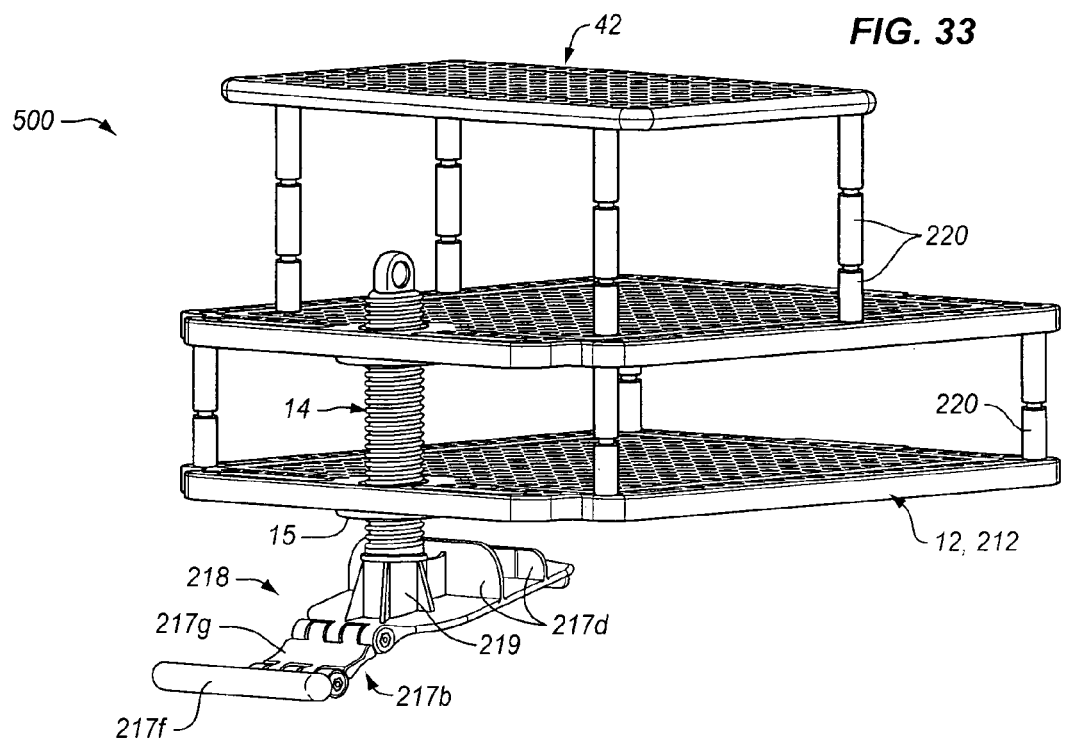

FIG. 33 is an isometric sketch representing, in a manner similar to that shown in FIG. 21, an alternative apparatus/system 500 having a lower platform 12 or 212, a mid-platform (not labeled, for simplicity, may be platform 12 or 212) positioned at midlevel and supported atop support-pins/uprights doubles, such as 220 (which fit into recesses in platform 12/212), and a top-platform 42 positioned at highest level, being supported atop several stacked uprights, such as 220. Alternative anchor assembly 218 (also depicted in FIGS. 27-29) is shown assembled and operationally ready for wedging between adjacent seat cushions.

Figure 34:
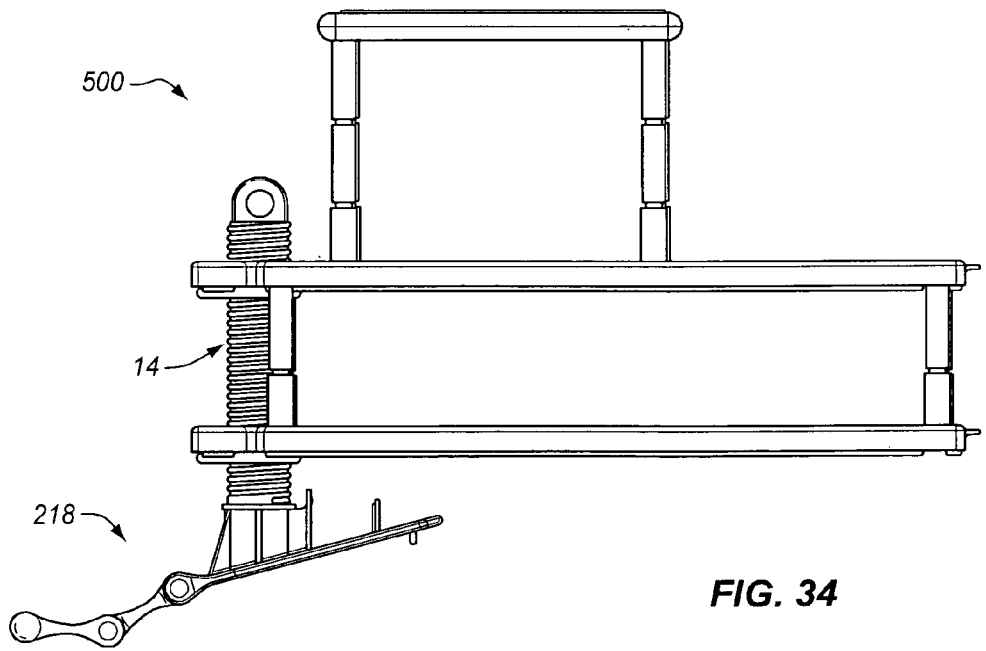

FIG. 34 is a side view of apparatus/system 500 of FIG. 33 representing, in a manner similar to assembly 110 of FIG. 19, an assembled system utilizing anchor 218.

DESCRIPTION DETAILING FEATURES OF THE INVENTION

By viewing the figures which depict associated representative structural embodiments, along with the technical materials background discussion outlined in any ATTACHMENTS, set forth above as well as further described below, one can appreciate the unique nature of core, as well as additional and alternative, features of the new apparatus and system. Back-and-forth reference is made to the various drawings—which detail core and additional features of the apparatus and system, and alternatives thereof, labeled with like reference numerals—to associate respective features for a better appreciation of the unique nature of the apparatus and system.

To begin, turn to the apparatus 10 in FIGS. 1-3. FIG. 2 is a side plan view (taken from the back of the FIG. 1 isometric sketch) and FIG. 3 is an exploded assembly isometric of apparatus 10: A platform 12 is shown supporting an item (e.g., receptacles 32 and 34), through which a primary support-post (a/k/a leveling post) 14 will be placed; also included is an anchor member 18, the bulbous end 17b of which is intended for tucking in between the spacing that generally exits between a passenger vehicle back cushion and a seat cushion (neither of which are shown here, for simplicity, but are sketched in phantom at 401 and 301, respectively, in FIG. 19). Regarding the cushion location, by way of example: FIG. 19 outlines representative positions of an anchor bulbous end 17b tucked between the spacing between a back cushion (sectional at 401) and seat cushion (sectional at 301).

FIGS. 5-7 depict various more-detailed views of anchor subassembly 18: FIG. 5 is an isometric view; FIG. 6 is a sectional view; FIG. 7 is a side plan view; FIG. 8 is a top plan view; and FIG. 9 is a front plan view. A free end 17a of anchor 18 will—in operation—sit/rest atop the seat cushion 301. An elongated protrusion 17d of anchor 18 operates as a 'stop' when the anchor bulbous end 17b is inserted between cushions, as can also be appreciated in FIG. 19. Between free end 17a and bulbous end 17b, anchor, 18, is a recessed, e.g., cup-shaped, pedestal 19 that extends such that its recess can receive a lower end of the primary support-post 14. As one can better appreciate when viewing FIGS. 5-9, support ribs around a periphery of the recessed pedestal 19 provide structural support thereto. The elongated stop-protrusion 17d extends in a generally width-wise direction across the anchor member 18 to operate as a 'stop' when the anchor is wedged between two cushions. One can also see that fins can be included along the bulbous end 17b.

Returning to FIGS. 1-3, platform 12 has an aperture (see also, FIGS. 11 and 12 at 25, 125) for accepting at least one primary support-post 14 (also referred to as leveling post). As can be better appreciated by viewing FIG. 24, at least a portion of support-post 14 is preferably threaded for accepting a leveling ring (15 in FIG. 13, 115 in FIG. 26) having a mating internally-threaded area (labeled 65 in FIG. 13, and 165 in FIG. 26). Platform 12 also has a plurality of recesses 13, 24 which may be through-holes (such as are shown in cross-section in FIG. 10A at 44 extending through the thickness of platform 42, or as labeled 224 in FIGS. 30 and 32 extending the outer perimeter area of platform 212) or may extend only through a portion of the thickness thereof (e.g., FIG. 10A at 43, 46 only recessed through a portion of the thickness of platform 42, or see FIGS. 30 and 32 at 213, 213' which are not through-holes). Note: In FIGS. 30 and 32 recesses 213, and the deeper rows of recesses labeled 213', are cup-shaped with a closed end; a light chamfer (bevel) may be added around inner wall-circumference of perimeter through-holes 224 in order to facilitate ease of entry of top of respective support-pins.

Each recess (13, 24, 43, 46, 44, 213, 213', 224) in a respective platform (such as 12, 42, 112, 212) is preferably sized for releasably accepting: (a) a lower-end 23, 223 of a stabilizing upright/support-pin such as 20, 220 (FIGS. 15 and 22), and/or (b) one of the feet/foot-protuberances (e.g., FIG. 4 at 33) secured to the underside of an item, such as a receptacle (e.g., a container 32 or box, a casserole/cooking pot, plate, bowl 34 and other such receptacle typically used for food storage, transport, or serving, and so on) or other item being supported (e.g., portable computerized device, modular desk component, piece of luggage, glassware, and so on). A platform 12, 212 may be equipped with additional features such as: a 'level' indicator (FIGS. 3 and 11 at 72, 73 and FIGS. 30 and 32 at 272, 273), a groove/channel interconnecting an outer series of recesses (in FIG. 10 these recesses have been identified at 46) creating a continuous pathway (FIGS. 10 and 11 at 47, FIG. 12 at 147, and FIG. 30 at 247) to catch liquid that spills atop the platform (e.g., the structure sometimes put into conventional cutting boards is known as a gravy trough, a channel made in the periphery of the cutting surface to collect liquid spillage thereon); and one or more solid regions, preferably void of recesses (such as the cutting surface area 175 within platform 112 of FIG. 12) providing a cutting or work surface functionality to the platform for preparation of meals, flower arrangements, a working/writing/key-stroking, and so on.

Preferably, the primary support-post 14 is structured as a threaded (64) cylinder around which a mating internally-threaded (65) leveling ring can twist (leveling ring is further detailed in FIGS. 13, 13A, 13B, 13C, 13T at 15, as well as FIG. 26 at 115). FIGS. 14, 14SP, 14B, 14A, and 24 detail the primary support-post (or, leveling post) 14: FIG. 14SP is a side plan view of FIG. 14; FIG. 14B is an end view; and FIG. 14A is a sectional taken along A-A of FIG. 14SP. Once placed around the circular threaded (64, so labeled in FIG. 14SP) periphery of the support-post 14, friction along the engaged and mating threaded sections (64 on post 14 and 65 inside leveling ring 15, or 115 inside leveling ring 115 of FIG. 26) bears the weight of the platform to that the platform does not slide down the support-post 14.

The terms 'leveling post' 14 or 'leveling ring' 15 have been used herein connection with these features in large part because the mating threaded sections (64 on post 14 and 65 inside leveling ring 15, or 115 inside leveling ring 115 of FIG. 26) provide a mechanism for controlling the vertical length of the post 14 between the pedestal 19 of anchor 18 and where the platform 12 rests—in effect providing a mechanism by which one can 'level' a platform 12 with respect to a seat cushion on which the platform is positioned (most seat cushions are curvature in shape, as shown by way of example in cross-section at 300, FIG. 19). As we know, when a load—e.g., an item, or another layer of platform(s)—is placed atop a platform, the torque on the platform changes, in turn, requiring an adjustment to re-level the platform. A level indicator (such as that labeled 73) in the platform 12 aids in finding an interconnection between post 14 and ring 15 so that the platform remains generally horizontal, or level. The aperture 25, 125 in the platform intended to receive the support-post/leveling ring subassembly (14/15) are likewise circular in shape. Handhold aperture 54 provides functionality; e.g., handy storage on a hook, handling ease, etc. As shown in FIGS. 30-32, alternative platform 212 has a gravy trough uniquely transformed into a storage groove 247' for support-pins 21, 220, 221. The storage groove 247' in communication with interconnected recesses (groove labeled 247) provides a continuous pathway for collecting spillage/liquids that flow atop the platform 212.

FIGS. 13, 13A, 13B, 13C, 13T, and 13SP depict various more-detailed views of the leveling ring assembly 15: FIG. 13 is an isometric view; FIG. 13A is a mid-sectional view; FIG. 13T is a top plan view of FIG. 13; FIG. 13B details the shape of intermesh projections 55 (taken within circular area labeled "B" in FIG. 13T); FIG. 13SP is a side plan view of FIG. 13; and FIG. 13C details the intermesh projections 55 within circular area "C" in FIG. 13SP. FIG. 26 depicts an alternative leveling ring structure 115, whereby a flat is provided 115a to facility storage of an assembled leveling post 14/leveling ring 115, such as is shown in FIG. 25, or if the anchor assembly 118 is hung on a wall in-between uses using the aperture (not labeled) at the free end 117a. One can notch the outside perimeter of the leveling ring 15, 115 for a closer fit within a platform aperture 25, 125, 225 that has been likewise notched/shaped. As shown throughout, by way of example: If the outer diameter of the leveling ring is notched as shown (see FIGS. 13, 13A, 13B, 13C, 13T, 13SP) the aperture (e.g., see FIG. 11 at 25, FIG. 12 at 125, and FIG. 30 at 225) in the platform for accepting the leveling ring 15 preferably has a mating inner diameter shape for alignment between the support-post/leveling ring subassembly (14/15, or 14/115) and a platform (12, 112, 212). When the lower end of the primary support-post 14 is inserted in the recessed pedestal 19, 219, a lip 16 extending around the periphery of the support-post is located so as to abut the cup-shape. In FIG. 26, a section of this lip has been removed (at 115a) providing a 'flat' useful in storing the primary post/leveling ring assembly 14/115 (depicted in FIG. 25).

As mentioned above, platform 12, 112, 42, 212 has a plurality of recesses—one or more of which can be through-holes (punched through the thickness of the platform) or extend through only a portion of the thickness of the platform. Where a lower-end (e.g., 23, 223) of a stabilizing upright/support-pins (e.g., 20, 220) is inserted into a recess of the platform, additional stabilizing uprights/support-pins (e.g., 21, 121, 221) may be stacked atop one another. An exploded view of this is shown in FIG. 3, with uprights 20 having an upper-end connection 26 into which the lower end of uprights 21 or 121 will fit. The stacking of stabilizing uprights is useful (1) when the platform is employed to support 'taller' items so that a longer upright than 20/220 is desired for aiding in the stabilization of an item atop the platform; and/or (2) to accept a $2^{nd}$, $3^{rd}$, etc., platform placed atop an upper-end of a plurality of top-most stabilizing upright (e.g., see platform 42 in FIGS. 19-21, and $2^{nd}$ platform 12 positioned atop the others, in FIG. 21).

FIGS. 15 and 15SP depict various views of a base stabilizing upright 20: FIG. 15 is an isometric; and FIG. 15SP is a side plan view of FIG. 15. FIGS. 16 and 16SP depict various views of an extender stabilizing upright 21: FIG. 16 is an isometric; and FIG. 16SP is a side plan view of FIG. 16. FIGS. 17 and 17SP depict various views of an extender stabilizing upright 121: FIG. 17 is an isometric; and FIG. 17SP is a side plan view of FIG. 17. FIGS. 22 and 22SP depict various views of an alternate base stabilizing upright 220: FIG. 22 is an isometric; and FIG. 22SP is a side plan view of FIG. 22. FIGS. 23 and 23SP depict various views of an alternate extender stabilizing upright 221: FIG. 23 is an isometric; and FIG. 23SP is a side plan view of FIG. 23. Further unique, are alternative stabilizing uprights having circumferential grooves (e.g., see FIG. 16 at 51, FIG. 22 at 250, and FIG. 23 at 151) creating a retention lip (as labeled with a CHAMFER) into which a retaining band (e.g., a 'rubber band' or some such flexible loop or retaining band—see FIGS. 1 and 2 at dotted line 300) is placed to stretch across an item, such as container 34, atop the platform to hold on a lid (not shown), or to simply further stabilize the item/container during transit (whether carried from location to location by hand or within a vehicle).

Returning, now, to: FIG. 4 is an under-side isometric view of item 32 so as to view the several feet/foot-protuberances 33 secured to the underside thereof, preferably sized to fit within suitably located recesses (13, 24, 43, 44, 46) within a platform (12, 112, 42). Note that, by way of example only, item 32 is shaped as a receptacle (e.g., a container, casserole/pot, bowl).

FIGS. 10, 10A, 10B depict various views of a platform subassembly 42: FIG. 10 is a top plan view; FIG. 10A is a partial sectional view of platform taken along A-A of FIG. 10, depicting three recesses 44 (a through-hole), 46 (interconnected via trough/channel 47), and inner recess 43 (the remaining array of recesses); and FIG. 10B is an end view of the platform 42. While the recesses 44, 46, 43 in FIG. 10 atop platform 42 are patterned in an x-y squared-off array, any pattern may be accommodated, suitable to accepting the uprights and/or the pattern of feet underneath an item intended for transport atop platform 42.

FIGS. 11-12 depict alternative platforms 12 with an x-y array of recesses peppered throughout the platform 12 within trough/channel 47, and level indicators 72, 73; and platform 112 having no interior recesses, so as to have a cutting/work surface 175 within trough/channel 147.

FIG. 18 is an isometric sketch representing an alternative apparatus 110 having platform 12, through which primary support-post/leveling ring subassembly (14/15) has been inserted. A second platform 42 is positioned above and supported atop pairs of stacked uprights 20 or 220, 21 (which fit into respective recesses in platforms 12, 42), and an anchor 18. FIG. 19 is a side plan view of apparatus/system 110 (taken from the front of the FIG. 18 sketch); as explained, depicts the wedging of the bulbous end 17b between spacing created be adjacent cushions, 400 and 300. FIG. 20 is a front plan view of apparatus/system 110 looking in from the right side of the FIG. 18 sketch (so that the platforms 12, 42 are in front of anchor 18).

FIG. 21 is an isometric sketch representing an alternative apparatus/system 210 having a lower platform 12, a mid-platform 42 positioned at midlevel and supported atop triplets of uprights 20 or 220, 121 or 221, 21 (which fit into recesses in platforms 12, 42), and a top-platform 12 positioned at highest level, being supported atop several stacked uprights. One can appreciate the flexibility of design by the many different configurations available for interconnecting assembly components of the invention.

FIGS. 24-25 depict two views of an alternative anchor subassembly 118 on which a support-post/leveling ring subassembly 14/15 in FIGS. 24 and 14/115 in FIG. 25 has been stored/stowed between a pair of bay-protrusions 117d and several support-pins 21, 221, 220 are stored in end-to-end fashion in-between pairs of bay-protrusions (not labeled for simplicity): FIG. 24 is an isometric view; and FIG. 25 is a side plan view. FIG. 25 outlines representative positions of an anchor bulbous end 117b tucked between the spacing between a back cushion (sectional at 402) and seat cushion (sectional at 302). In this case, bulbous end 117b is comprised of one or more hinged-sections (here, two, labeled 117f and 117g) interconnected with the base member. This unique subassembly accommodates a wide variety of sizes of adjacent seating/cushions. Bay-protrusions (labeled 117d) have been integrated with the base member of anchor member 118 to extend, in pairs, width-wise across the base member for handy storage/stowing of the primary support-post/leveling post 14 atop the anchor's base 117c. Anchor member 118 also has shorter protrusion pairs (labeled 117e) for handy storage of one or more support-pins (21, 221, 220), end-to-end, on the base member 117c of anchor 118. Between free end 117a and bulbous end 117b of anchor base member 117c, is a recessed, e.g., cup-shaped, pedestal 119 that extends such that its recess can receive a lower end of the primary support-post 14 (a/k/a leveling post). As one can appreciate (see also FIGS. 5-9), support ribs around a periphery of the recessed pedestal 119 provide structural support thereto.

As explained above, FIG. 26 is an isometric view of an alternative leveling ring assembly 115 to that depicted elsewhere at 15.

FIGS. 27-29 depict various isometric views of yet another alternative anchor subassembly 218, including a pair of bay-protrusions 117d between which a support-post/leveling ring subassembly (shown elsewhere at 14/15) may be stowed as shown in FIGS. 24-25. FIG. 27-28 are isometric views; FIG. 29 is a top plan view. Bay-protrusions have been integrated with the base member of anchor member 218 to extend (labeled 217d), in pairs, width-wise across the base member for storing the primary support-post/leveling post 14. Anchor member 218 has no shorter protrusion pairs for storing one or more support-pins, end-to-end, as are included (labeled 117e) in the anchor member 118 depicted in FIGS. 24-25. Width-wise bay-protrusion extensions 217d preferably have an elongated notch along inwardly facing walls to aid in securing the leveling post (shown in a stored position in FIGS. 24-25).

As shown in FIGS. 27, 28, and 34 (but only labeled in FIG. 28) friction bar-extenders 217j at free-end 217a increase friction when bulbous end 217b is wedged between cushions (e.g., see FIG. 25 where bulbous end 117b comprised of two hinged sections 117f and 117g are wedged between cushion structures labeled 402, 302) to provide further stability in the event the vehicle driver 'slams on the brake.' Operationally, the friction bar-extenders 217j cooperate with the apparatus as follows: Upon applying the brake to a moving vehicle, the force of the food contained within receptacles (or other items) being held with support-pins atop a platform, will cause the items to attempt to shift. In doing so the platform will pull on the leveling post 14, which has been assembled with the anchor member 218 (e.g., see FIGS. 1-2 for assembly of a primary support post 14 with an anchor member 18). When the leveling post 14 is pulled forward it will attempt to leverage downward thereby placing a downward force on the anchor base, pushing the friction bar-extenders 217j down into the seat cushions, restricting the forward, slippage movement of the anchor in the seat.

FIGS. 30-32 depict various isometric views of yet another alternative platform member 212: FIG. 30 is a top plan isometric; FIG. 31 is a side plan view; and FIG. 32 is a bottom plan view. Additionally unique features have been explained as set forth above.

FIG. 33 is an isometric sketch representing, in a manner similar to that shown in FIG. 21, an alternative apparatus/system 500 having a lower platform 12 or 212, a mid-platform (not labeled, for simplicity, may be platform 12 or 212) positioned at midlevel and supported atop support-pins/uprights doubles, such as 220 (which fit into recesses in platform 12/212), and a top-platform 42 positioned at highest level, being supported atop several stacked uprights, such as 220. Alternative anchor member 218 (also depicted in FIGS. 27-29) is shown assembled and operationally ready for wedging between adjacent seat cushions. Similar to anchor 118 of FIGS. 24-25, here, bulbous end 217b is comprised of one or more hinged-sections (here, two, labeled 217f and 217g) interconnected with the base member. As explained above, this unique subassembly accommodates a wide variety of sizes of adjacent seating/cushions. Bay-protrusions (labeled 217d) have been integrated with the base member of anchor member 218 to extend, in pairs, width-wise across the base member for handy storage/stowing of the primary support-post/leveling post 14 (which in FIG. 33-34 is operationally assembled).

FIG. 34 is a side view of apparatus/system 500 of FIG. 33 representing, in a manner similar to assembly 110 of FIG. 19, an assembled system utilizing anchor 218. As in FIG. 33, a lower end of the primary support-post 14 is shown inserted in the recess/cup of the pedestal 219, such that a lip extending around the periphery of the support-post is located to abut a periphery of the cup.

The following EXAMPLE 1 details certain physical characteristics exemplary of a preferred-alternative embodiment of an assembly and associated system contemplated hereby. While reference has been made to dimensions/sizing, and further detail and additional optional nomenclature of certain features identified, this in no way is to be construed as limiting the unique combination of components of an assembly and system of the invention.

While certain representative embodiments and details have been shown for the purpose of illustrating the invention, those skilled in the art will readily appreciate that various modifications, whether specifically or expressly identified, may be made to representative embodiments without departing from the novel core teachings or scope of this technical disclosure.

Accordingly, all such modifications are intended to be included within the scope of any claims included. Furthermore, in any claim that is filed herewith or hereafter, any means-plus-function clauses used, or later found to be present, are intended to cover at least all structure(s) described herein as performing the recited function and not only structural equivalents but also equivalent structures.

EXAMPLE 01

Using the platform, anchor, and stabilizing pins/uprights in conjunction with each other, the assembly can be securely frictionally wedged within vehicle passenger seat(s). Once the anchor is securely wedged between seating cushions, the platform can be engaged and used to support a number of food container(s) and/or other object(s). Lateral stability of the food container(s) and/or other object(s) is aided using stabilizing pins/uprights. Since the platform is perforated with a grid pattern of recesses (whether extending all the way through the platform thickness, or only part-way), pins are placed around such container(s)/object(s) to hold them in place atop the platform while the vehicle is in motion and/or while the platform is being carried by hand. In the case where a special brand line of food containers may be manufactured with "pin-like" feet on the bottom, these feet can be inserted directly into recesses in the platform sized to accept the feet. For added stability, pins/uprights may still be employed. Once the components are assembled, it is helpful to level the platform while it's secured to the passenger seat(s): The leveling operation can be accomplished using the leveling post/primary support-post. A user preferably waits until the platform is loaded with weight (i.e., filled food container(s) and/or other items/object(s) placed atop platform(s)) intended for transport before performing the leveling operation, since an empty platform will level differently than a loaded one.

By Way of Representative Example, Only, for this EXAMPLE 01:

A platform may be fabricated from a single piece of either HDPE (High Density Polyethylene) or UHMW (Ultra-High Molecular Weight Polyethylene) 0.625" in thickness, 15.500" in width and an overall length of 18.500" and is used as the main hard surface upon which food, food containers and/or other objects may be secured. The forward two corners of the platform have a 0.625" radius. The rear portion of the platform is indented thereby forming a six-corner rear. Each corner consists of a 0.625 radius. Refer to the design drawings for a more detailed, pictorial explanation of this shape of the rear portion of the Platform. Around the entire perimeter of the platform there exists a radius of 0.3125" from top to bottom. This forms a completely rounded edge (vertical hemisphere cross-section) in the thickness of the platform. In the interior of the platform ("field") there exists a grid pattern of 0.500" diameter holes whose centers are on 0.750". All holes of this type are drilled to a depth of 0.500" with flat bottoms. Connecting all the "field perimeter" holes is a small trough measuring 0.094" in depth and 0.094" in width and whose center line is in line with the centers of the field perimeter holes. The trough, comprised of recesses in communication by way of a channel, is suitable for 'catching' spilled liquid(s) atop the platform. The outer-most perimeter holes are drilled thru the complete 0.625" thickness of the platform. On the underside of each perimeter hole exists a small circumferential chamfer of 30°. Having a centerline of 8.000" in the platform's width there is a thru-hole with major and minor diameters. The major diameter specifies the largest diameter and the minor specifies the smallest diameter of the thru hole. One reason for two differing hole diameters is the result of a "Castle Wall" or "Trapezoidal Gear" shape around ¾ of the perimeter of the hole. There exists an "in and out" shape (as one traverses the hole perimeter), similar to that of the top of a traditional castle wall or gear drive. This shape persists around ¾ of the circumference of the hole. The last ¼ arc of the hole has a small depression towards its rear, used in hanging the Platform for storage purposes. The major diameter measures 2.000" where the minor diameter measures 1.790". Each "Castle Wall Stud" measures 0.134" in width, each of which is evenly circum-spaced around the thru hole circumference with a spacing of 0.267" Center-Line to Center-Line. On the underside of each of the "Castle Wall Studs" exists an "arrow head" point measuring 0.116" in height. This facilitates easy engagement: vertically mating the leveling ring to the platform. On the under side of this "Castle Wall" thru hole exists a small circumferential chamfer of 45°. Refer to the design drawings for a more detailed, pictorial explanation of this thru hole and the "Castle Wall" shapes as described above. Lastly, with a 9.000" dimension to their starting edges, referenced from the platform's rear edge, there exist two small level bubbles, one on each side of the platform and whose longitudinal center line is exactly in-line with that of the perimeter thru holes' center line. These level indicator vials can be employed to specify when the platform is in level, or not. Two level indicator vials can be used so that reading the level state of the platform is handier, regardless of the side of the vehicle the user chooses to wedge-in the assembly. The top of the level bubble can be 0.031" below the top surface of the platform.

On an opposite side of an alternative platform, it may be desirable to leave a large open area—void of recesses—for use as a work/cutting surface (for example, recesses that do not extend through the full thickness of the platform can be used over an area, so that on the flip side of that area of the platform, the work/cutting surface remains un-pocked of recesses). Once again, a gravy trough could be channeled around the full perimeter of the work surface, just inside of the thru holes. An example trough measures 0.375" in width and 0.250" in depth.

One can employ a $2^{nd}$ platform (42) having the same width dimension (15.500") as the main platform (12) but shorter, e.g., only 8.750", in length (say, roughly ½ of the length of main platform 12). The ½-sized platform will still serve the same basic function of the main platform, however, it may be used for stacking on different levels of platforms. This smaller version of the main platform can likewise have a small trough around the "field perimeter" holes just as the main platform has. All ½-sized platform perimeter recesses can be thru holes and with a diameter of 0.500". All interior "field" holes will may be partially thru and be 0.500" in diameter and 0.500" in depth. Perimeter thru hole recesses can have a circumferential chamfer around their bottom edge. This smaller ½-sized platform will also have a thickness of 0.625". The ½-sized platform can be placed atop uprights on the main platform as long as support is provided by a minimum of 4 stabilizing pins/uprights. Along the perimeter of one of the shorter sides of a platform an additional hole can be drilled, say measuring 0.625" in diameter, for hanging the platform on a nail, for handy storage in the kitchen, garage, shed, etc.

Stabilizing pins (sometimes simply referred to as pins, or stabilizing uprights) are used to secure food, food containers and/or other objects to the platform restricting its movement when a directional force is applied while the platform is in transit (either in a vehicle or being carried).

Base Pin—It's overall height dimension measures 2.683". This Base Pin is comprised of three sub-sections: a bottom stem section, middle Pin section and a top extension screw section. The bottom stem is inserted into any of the Platform's top surfaces' holes, thru or not, in order to secure the Pin to the Platform. The stem measures 0.497" in diameter by 0.495" in height. The middle Pin section is simply used for securing the food or other object(s) to the Platform by placing it as close as possible to the object. This middle section measures 0.625" in diameter by 1.688" in height. The top extension screw is used to screw into the bottom of the top Pin or the bottom of an extension Pin (both described below). This top extension screw has a ⅜-16 course thread by 0.500" in height.

Pin Extension—It's overall height dimension measures 1.500". This section of a main Stabilizing Pin comprises a Pin section and a top extension screw. This Pin section simply extends the length of a main Stabilizing Pin by the user's desired length. This Pin Extension attaches to the Base Pin by simply screwing it onto the Base Pin's top extension screw. It aids in securing food or other object(s) to the Platform by placing it as close as possible to the object. The Pin Extension also has a top extension screw measuring ⅜-16 course thread by 0.500" in height.

Top Pin—Its overall height dimension measures 2.376". This section of the Stabilizing Pin comprises a Pin Section and a Register. This Top Pin completes the main Pin structure and is mainly used for securing food or other object(s) to the Platform by placing it as close as possible to the object. The Pin Section measures 0.625" in diameter by 1.500" in height. The Pin Section also has a threaded hole for receiving any of the top mounted ⅜-16 course threaded screws on any of the components below it. This threaded hole is 0.563" in depth. The Register is used for locating and securing additional Platforms placed on top of it (needing a minimum of 3 Stabilizing Pins to support 1 overhead Platform) thereby giving the ability to construct multiple Seat Shelf™ Platform levels. The Register itself measures 0.490" in diameter by 0.571" in height with a flattened top having a circumferential chamfer and a circumferential notch just below the Register's top. The flattened top will only stick 0.063" above the top surface of any Platform being supported. The circumferential notch measures 0.282" down from the top and is 0.094" in depth and 0.125" in height. When these Stabilizing Pins are not being used to support other Platforms overhead this notch could be used to attach elastic or non-elastic material to in order to facilitate even more secure "hold down" pressure to any object being held in place by the Stabilizing Pins (i.e. rubber band(s) or elastic cord crisscrossed over top of a food container lid—the container contains, say, soup for instance). This Register will be inserted into any of the perimeter thru holes of any of the two sized (full or ½) Platforms, described above.

The anchor sub-components are further described, by way of example only, as follows:

Anchor Base—This is the component of the Anchor which actually fits, via a pushing action on the part of the end-user, into the crack of the vehicle seat formed by the car seat's seat and the car seat's back. 99% of all vehicles surveyed have this formed crack; although there does exist some variation in size, backing material, depth, seat material, tightness and location. Once in place the Anchor Base maintains a snug fit, resisting pull-out due to a very high coefficient of friction. The friction fit along with registering the depth of insertion is accomplished by means of various solid shapes protruding from the base itself. The Anchor Base measures 9.000" in length by 6.000" in width by 0.250" in thickness. Around three of the four sides (not the rear side) of the Anchor Base exists a 0.125" radius to form a smooth, rounded edge for contact when placed on a vehicle's seat surface supporting weight. (For the sake of this exemplary discussion, the following description will start describing components from the far left-hand side (rear) continuing to the far right-hand side (front) of the Anchor Base, in sequence). At the end of the Base there exists a 0.750" diameter friction tubular shape (herein know as a "Friction Tube") connected to the 0.250" thick Base and extending over its complete width. This friction tube is made up of several "ribs" measuring 0.125" in thickness spaced 0.125" apart. The ribs at the ends of the friction tube have a 0.063" radius eliminating any sharp edges so as to not risk cutting into the seat material when inserted into and/or removed from the seat by the end-user. The friction tube component serves as the single source of greatest friction to keep the Base secured to the vehicle's seat. The center line of this friction tube is inline with the center line of the Base's 0.250" thickness thereby causing one half of the friction tube to be on the top side of the Anchor Base and the other half on the underside of the Anchor Base. Moving right, the next protrusion is an elongated half-circle structure measuring 0.500" in width by 1.000" in height acting as an insertion "stop" (IS) for the Base. It is made up of supporting ribs, exactly like those in the friction tube (described above). Also, just like the friction tube, the end ribs of the IS have a 0.063" radius preventing any damage to vehicle seat material. Refer to design drawings for a more detailed pictorial of this structure. This IS is on the top side of the Base. The start of the IS is 3.000" from the friction tube's junction with the top side of the Anchor Base traveling rightward along the Base. When the Base is inserted into the car seat's back separation, the user continues to insert the Base until the insertion action is interrupted by the IS thus insuring the Base is seated (registered) tightly in the car seat. The sides of the IS are parallel to the Anchor Leveling Post tube (described next). Continuing right and on the top side again there exists a tube used to insert the Anchor Leveling Post. This tube is offset at a 105° angle from the Base's horizontal plane to accommodate most (average) vehicles' car seat angle. The tube has a wall thickness of 0.125" and an I.D. of 1.500". It measures 1.000" in height along its shortest vertical height referenced from the top side of the Base. Around the perimeter of this tube are eight triangular shaped supporting ribs each at 45° from one another. These ribs stiffen the tube's perimeter wall when needed (i.e. in the case where the vehicle stops abruptly—driver slams on brakes to avoid an accident). The balance of the horizontal Anchor Base extends past the Anchor Leveling Post tube 1.250" for a total of 9.000". The last feature of the base is a thru hole measuring 0.625" in diameter with a 0.063" circumferential radius on both sides. This hole is used for hanging purposes when storage is desired.

There is a variation of the Anchor Base described above to accommodate those car seats with extra large spacing between seat and back cushions above the surface of the seat cushion (may be found in bucket seat style cars). This height above the car seat's seat varies anywhere from 2.000"-3.000" in some vehicles. All components of this Anchor Base variation can be built the same as the Anchor Base described above with the exception of an "S" curve in the Base's 0.250" thick plate. This "S" curve replaces the IS described above. The reason being that the characteristics of the "S" curve will automatically "stop" the insertion of the Base into the space between seat and back cushion. The "S" curve measures 2.000" in height by a depth of 3.000". This 3.000" depth, like the first variation described above, will ensure adequate insertion into the car seat's crack in order for the Friction Tube to contact enough car seat material for the highest coefficient of friction. The 2.000" height is suitable height to accommodate some vehicle bucket seat styles and rear seat configurations.

The last component to the Base is in two parts: an Anchor Leveling Post (ALP) and its Leveling Ring (LR)—The Anchor Leveling Post is the main structural member which connects the Platform(s) to the Base as well as levels out the Platform(s) once its in place and under load. In operation it is placed inside the Anchor Leveling Post Tube on the top side of the Base until it stops. This allows for free rotation of the ALP as it will be turned clockwise and/or counter-clockwise by a user to achieve a level Platform(s) state. The overall height of the ALP is 8.000". The base of the ALP measures 1.500" in diameter to accommodate a snug fit inside its tube. That section of the ALP which fits inside the Anchor Leveling Post Tube will be 1.000" in height. Then a ring measuring 0.125" in width and 0.125" in height will protrude from the ALP's side acting as a "stopper" ring when the ALP is inserted into its tube on the top side of the Base. From here on up to 1.000" down from the top end of the ALP is a 1-24 threaded section to accommodate the Leveling Ring (described below). The last top 1.000" of the ALP is parallel cut in, vertically, on two sides by 0.500". This leaves a 0.500" thick middle section of the ALP exposed. This exposed section has a semi-circle top without any 1-24 threads cut into it and a 0.250" radius over its full arc-edge. This semi-circle handle also has a thru hole in it for hanging purposes. Its center is 0.750" from any point along its main top arc and is 0.625" in diameter. It also has a 0.063" circumferential radius around it edges on both sides. The function of this exposed top section of the ALP serves as a small thumb-finger handle by which the user would turn the ALP clockwise and/or counter-clockwise in order to level the Platform(s) once the Anchor Base was in place in the vehicle's seat and the Platform(s) was under load.

The Leveling Ring (LR) is comprised of two functional, yet integrally formed, parts. The LR, as a whole, will serve as the resting surface upon which a Platform will seat itself in order to be leveled when in place. The dimensions of the first structural part of the LR will be 3.000" in diameter having circumferential radii of 0.125" around the ring and 0.250" in thickness. The second structural part of the LR will be cylindrical in nature having a wall thickness of 0.125", an O.D. to accommodate the threaded ALP and a height of 0.625" (making the combined, overall height of the LR to be 0.875"). Where a Platform rests will be that part of the LR which measures 0.250" in thickness. The LR will also have a 1-24 thread cut into its center cylinder to match those on the ALP so as to vertically travel, up and down, when the user rotates the ALP in order to level the Platform(s). Around the outside perimeter of the second structural part exists a band of matching "Castle Wall" notches to vertically mate with those in the Platform's ALP aperture. At the top of each notch exists an "arrow head" point to facilitate easy insertion of the LR into the Platform's ALP aperture. Once inserted, the LR is unable to rotate freely as the ALP is rotated. This inability to rotate will force the LR to vertically travel up and/or down, depending upon the direction of rotation determined by the end-user rotating the ALP.

One can employ various food container types ranging from (but not limited to) Casserole to Ramekin to Bowl to Plate (Dish) to Cake, etc. Each Container may or may not have its own sealing top to contain/seal food inside the Container during transport/storage. On the bottom of each Container exists a set of small feet used to secure the Container to a Platform. These feet have the same dimensions as the Base Pin's bottom stem section. The center points of all the feet on the bottom of each Container will exactly be in line with all the center points of all the field holes in the Platform(s)—grid matching. This will ensure any Container securely attaching to the Platform when the Container is pushed into the Platform's perimeter/field holes and any two of the Container's feet are parallel to the X and/or Y direction of the Platform's grid pattern formed by its perimeter/field holes. The stem section measures 0.497" in diameter by 0.495" in height. If the end-user chooses to use these specially designed Containers, one may not need to also use Stabilizing Pins to secure food containers to the Platform.

I claim:

1. An assembly for supporting an item while in transit within a vehicle having cushioned passenger seating, the assembly comprising:

(a) a platform for supporting the item; the platform having an aperture for receiving at least one primary support-post therethrough, and a plurality of recesses sized for releasably accepting a lower-end of a stabilizing upright/support-pin;

(b) an anchor for releasably securing the assembly between cushion structures within the vehicle; the anchor comprises a base member having a free end and a bulbous end, between which a pedestal extends having a cup for receiving a lower end of the primary support-post;

(c) at least a portion of the outer surface of the primary support-post is threaded, around which a mating internally-threaded leveling ring can twist for height adjustment above the base member when the lower end of the primary support-post is received by the pedestal cup; and (d) an inner wall of the aperture in the platform sized for receiving both the support-post and the leveling ring, the inner wall of the aperture in the platform shaped to mate with an outer diameter of the leveling ring once in place around the support-post.

2. The assembly of claim 1 wherein the platform further comprises:
   (a) a level indicator positioned within a recess of the platform;
   (b) a groove interconnecting a series of the recesses located adjacent one another, creating a pathway for liquids that flow atop the platform; and
   (c) at least one solid region void of the recesses and usable as a cutting preparation surface.

3. The assembly of claim 1 wherein the anchor further comprises:
   (a) a plurality of support ribs around a periphery of the pedestal;
   (b) a pair of elongated bay-protrusions integrated to extend width-wise across the base member of the anchor for storing the primary support-post when not in operation; and
   (c) the bulbous end further comprising a bulbous section hinged to a hinged-extender section interconnected with the base member of the anchor.

4. The assembly of claim 1 wherein:
   (a) at least one of the plurality of recesses is a through-hole punched through a thickness of the platform
   (b) the outer diameter of the leveling ring is notched and the inner wall of the platform, aperture is likewise notched for a close mechanical fit providing a mechanism by which an alignment can be performed between the support-post and the leveling ring subassembly and the platform; and
   (c) the lower end of the primary support-post is inserted in the cup of the pedestal, such that a lip extending around the periphery of the support-post is located to abut a periphery of the cup.

5. The assembly of claim 1:
   (a) wherein at least one of the plurality of recesses is a through-hole punched through a thickness of the platform and at least one of the plurality of recess extends through only a portion of the platform thickness; and
   (b) further comprising a second-type stabilizing upright shaped for stacking end-to-end atop the first stabilizing upright; each said second-type stabilizing upright having a circumferential groove creating a retention lip into which a retaining band can be placed.

6. The assembly of claim 1 further comprising first and second pairs of elongated bay-protrusions integrated to extend width-wise across the base member of the anchor; when not in operation, the primary support-post is stored in-between the first pair of bay-protrusions, and when not in operation, a plurality of the stabilizing upright/support-pins is stored in end-to-end fashion in-between the second pair of bay-protrusions.

7. The assembly of claim 1 further comprising:
   (a) the lower-end of each of a plurality of said stabilizing upright/support-pins having been inserted into a respective one of the plurality of recesses sized therefor; and
   (b) a plurality of second-type stabilizing uprights, each of the second-type stabilizing upright shaped to stack end-to-end atop a respective one of the plurality of first stabilizing upright/support pins.

8. The assembly of claim 1, in operation to support the item while in transit, wherein the bulbous end further comprises a bulbous section hinged to a hinged-extender section interconnected with the base member of the anchor; and further comprising:
   (a) the lower-end of each of a plurality of said stabilizing upright/support-pins is inserted into a respective one of the plurality of recesses sized therefor;
   (b) the lower end of the primary support-post is inserted into the pedestal cup;
   (c) both the support-post and the leveling ring, in place around the support-post, have been received by the aperture in the platform; and
   (d) the bulbous section is wedged between the cushion structures.

9. An assembly for supporting an item while in transit from location to location, the assembly comprising:
   (a) a platform for supporting the item by placing the item atop said platform; said platform having a plurality of recesses, a first and second of said recesses sized for releasably accepting a lower-end of each of a plurality of first stabilizing uprights, and at least a third of said recesses sized for accepting a foot-protuberance extending downwardly from the underside of the item;
   (b) at least a portion of the plurality of recesses extending through only a portion of a thickness of the platform; and
   (c) a plurality of second-type stabilizing uprights each shaped for stacking end-to-end atop a respective one of the plurality of first stabilizing uprights; each said second-type stabilizing upright having a circumferential groove creating a retention lip.

10. The assembly of claim 9 wherein the platform further comprises:
    (a) a level indicator positioned within a recess of the platform;
    (b) a groove interconnecting a series of the recesses located adjacent one another, creating a pathway for liquids that flow atop the platform; and
    (c) at least one solid region void of the recesses and usable as a cutting preparation surface.

11. The assembly of claim 9 wherein a retaining band is stretched around and within the retention lip of a first, second, and third of the plurality of second-type stabilizing uprights having been stacked end-to-end atop a respective first, second, and third of the plurality of first stabilizing uprights.

12. The assembly of claim 9 intended for transit within a vehicle from location to location, further comprising:
    (a) the platform having an aperture for receiving at least one primary support-post therethrough; and
    (b) an anchor for releasably securing the assembly between cushion structures within the vehicle; the anchor comprises a base member having a free end and a bulbous end, between which a pedestal extends having a cup for receiving a lower end of the primary support-post.

13. The assembly of claim 12 wherein the bulbous end further comprises a bulbous section hinged to a hinged-extender section interconnected with the base member of the anchor.

14. An assembly for supporting an item while in transit within a vehicle having cushioned passenger seating, the assembly comprising:
    (a) a platform for supporting the item; the platform having an aperture for receiving at least one primary support-post therethrough;
    (b) an anchor for releasably securing the assembly between cushion structures within the vehicle; the anchor comprises a base member having a free end and a bulbous end, between which a pedestal extends having a cup for receiving a lower end of the primary support-post;
    (c) the platform further comprising a plurality of recesses sized for releasably accepting a lower-end of a stabilizing upright/support-pin; and further comprising first and second pairs of elongated bay-protrusions integrated to extend width-wise across the base member of the anchor; when not in operation, the primary support-post is stored in-between the first pair of bay-protrusions, and when not in operation, a plurality of the stabilizing upright/support-pins is stored in end-to-end fashion in-between the second pair of bay-protrusions.

15. An assembly for supporting an item while in transit within a vehicle having cushioned passenger seating, the assembly comprising:
   (a) a platform for supporting the item; the platform having an aperture for receiving at least one primary support-post therethrough;
   (b) an anchor for releasably securing the assembly between cushion structures within the vehicle; the anchor comprises a base member having a free end and a bulbous end, between which a pedestal extends having a cup for receiving a lower end of the primary support-post;
   (c) the platform further comprising a plurality of recesses sized for releasably accepting a lower-end of a stabilizing upright/support-pin; and
   wherein the lower-end of each of a plurality of said stabilizing upright/support-pins is inserted into a respective one of the plurality of recesses sized therefor; and further comprising a second platform positioned above and supported atop the plurality of said stabilizing upright/support-pins inserted.

16. The assembly of claim 15 wherein the second platform has an aperture for receiving the primary support-post therethrough, the aperture in the second platform sized for receiving both the support-post and an internally-threaded second leveling ring, the inner wall of the aperture in the second platform shaped to mate with an outer diameter of the second leveling ring once in place around the support-post.

17. The assembly of claim 15 further comprising:
   plurality of second-type stabilizing uprights, each of the second-type stabilizing upright shaped to stack end-to-end atop a respective one of the plurality of first stabilizing upright/support pins.

* * * * *